(12) United States Patent
Guo et al.

(10) Patent No.: US 12,479,886 B2
(45) Date of Patent: Nov. 25, 2025

(54) INHIBITORS OF IL-15 AND THEIR USE IN TREATING AUTOIMMUNE/INFLAMMATORY DISORDERS

(71) Applicant: University of Houston System, Houston, TX (US)

(72) Inventors: Bin Guo, Sugar Land, TX (US); Gomika Udugamasooriya, Katy, TX (US); Satya Prakash Shukla, Houston, TX (US); Kwang Bog Cho, Houston, TX (US); Shuang Zhou, Houston, TX (US)

(73) Assignee: University of Houston System, Houston, TX (US)

( * ) Notice: Subject to any disclaimer, the term of this patent is extended or adjusted under 35 U.S.C. 154(b) by 746 days.

(21) Appl. No.: 17/624,523

(22) PCT Filed: Jun. 30, 2020

(86) PCT No.: PCT/US2020/040324
§ 371 (c)(1),
(2) Date: Jan. 3, 2022

(87) PCT Pub. No.: WO2021/003171
PCT Pub. Date: Jan. 7, 2021

(65) Prior Publication Data
US 2022/0242907 A1    Aug. 4, 2022

Related U.S. Application Data

(60) Provisional application No. 62/870,318, filed on Jul. 3, 2019.

(51) Int. Cl.
| *C07K 7/06* | (2006.01) |
| *A61K 38/08* | (2019.01) |
| *A61K 45/06* | (2006.01) |
| *A61P 29/00* | (2006.01) |
| *A61K 38/00* | (2006.01) |

(52) U.S. Cl.
CPC ............... *C07K 7/06* (2013.01); *A61K 38/08* (2013.01); *A61K 45/06* (2013.01); *A61P 29/00* (2018.01); *A61K 38/00* (2013.01)

(58) Field of Classification Search
CPC C07K 7/06; A61P 29/00; A61K 38/08; A61K 45/06; A61K 38/00
See application file for complete search history.

(56) References Cited

U.S. PATENT DOCUMENTS

| 2010/0166754 | A1 | 7/2010 | Spies et al. | |
| 2011/0077201 | A1 | 3/2011 | Kodadek et al. | |
| 2013/0178835 | A1* | 7/2013 | Gocke | A61M 37/00 604/522 |
| 2015/0224208 | A1* | 8/2015 | Ueki | A61K 47/54 536/27.22 |
| 2016/0122406 | A1* | 5/2016 | Coy | A61K 45/06 514/17.7 |
| 2019/0076400 | A1* | 3/2019 | Anandan | A61P 29/00 |

FOREIGN PATENT DOCUMENTS

| WO | WO-2017015644 A1 * | 1/2017 | ............. A61K 38/00 |
| WO | WO 2017/046200 | 3/2017 | |
| WO | WO2018/053472 | 3/2018 | |

OTHER PUBLICATIONS

La Manna et al (Peptides as Therapeutic Agents for Inflammatory-Related Diseases Review article for International Journal of Molecular Sciences, vol. 19, published Sep. 11, 2018. (Year: 2018).*
Cho et al., "A peptoid interleukin-15 receptor antagonist suppresses inflammation and arthritis in mice", *Clinical & Translational Immunology*, e1432, 2022.
Desai et al., "Identification of lipid-phosphatideylserine (PS) as the target of unbiasedly selected cancer specific peptide-peptoid hybrid PPS1", *Oncotarget*, 7(21):1-13, 2016.
European Search Report and Written Opinion for EP Appl. No. 20834509.0 dated Feb. 19, 2024.
Invitation to Pay Additional Fees for PCT/US2020/040324 dated Sep. 22, 2020, 2 pages.
International Search Report and Written Opinion for PCT/US2020/040324 dated Feb. 12, 2021, 11 pages.
Matharage et al., "Unbiased selection of peptide-peptoid hybrids specific for lung cancer compared to normal lung epithelial cells", *ACS Chem Biol.*, 10(12):2891-2899, 2015.
Shukla et al., "A unique mid-sequence linker used tomutlimerize the lipid-phosphatidylserine (PS) binding peptide-peptoid hybrid PPS1", *European J. Med. Chem.*, 137:1-10, 2017.
Singh et al., "Development of a Large Peptoid-DOTA Combinatorial Library", *Biopolymers (Peptide Science)*, 106:673-684, 2016.

* cited by examiner

*Primary Examiner* — Catherine S Hibbert
(74) *Attorney, Agent, or Firm* — pH IP LAW

(57) ABSTRACT

The present disclosure is directed to peptoids and peptoid multimers that inhibit IL-15 and their use in treating autoimomune/inflammatory diseases.

9 Claims, 17 Drawing Sheets

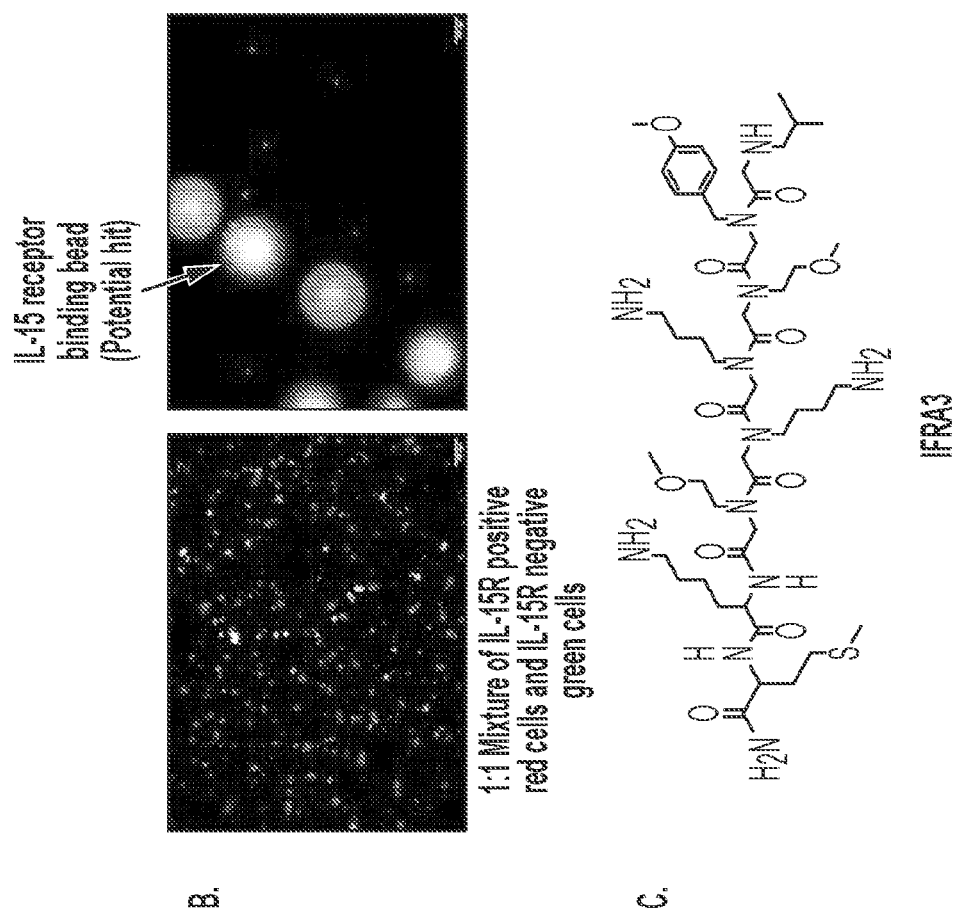
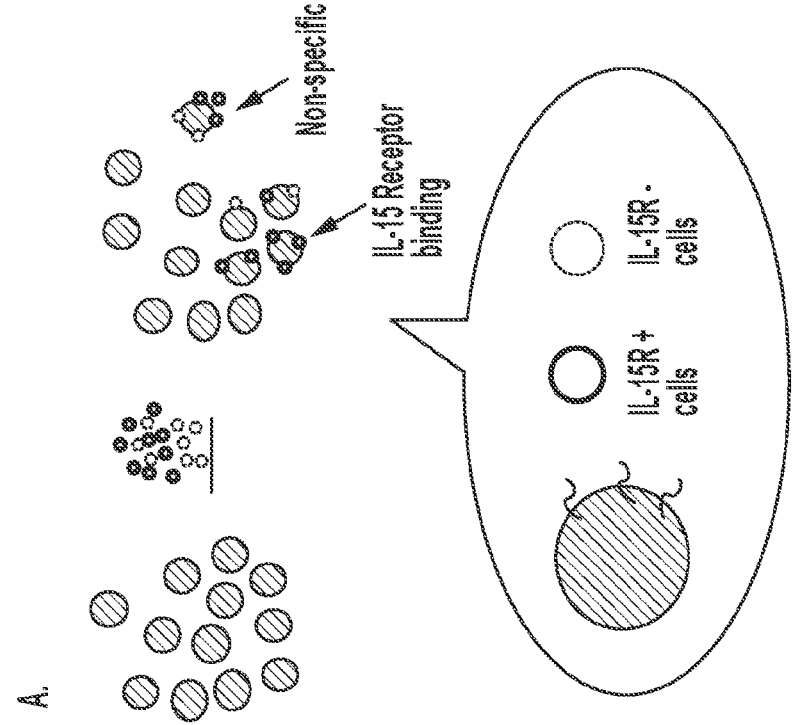
FIGS. 1A-C

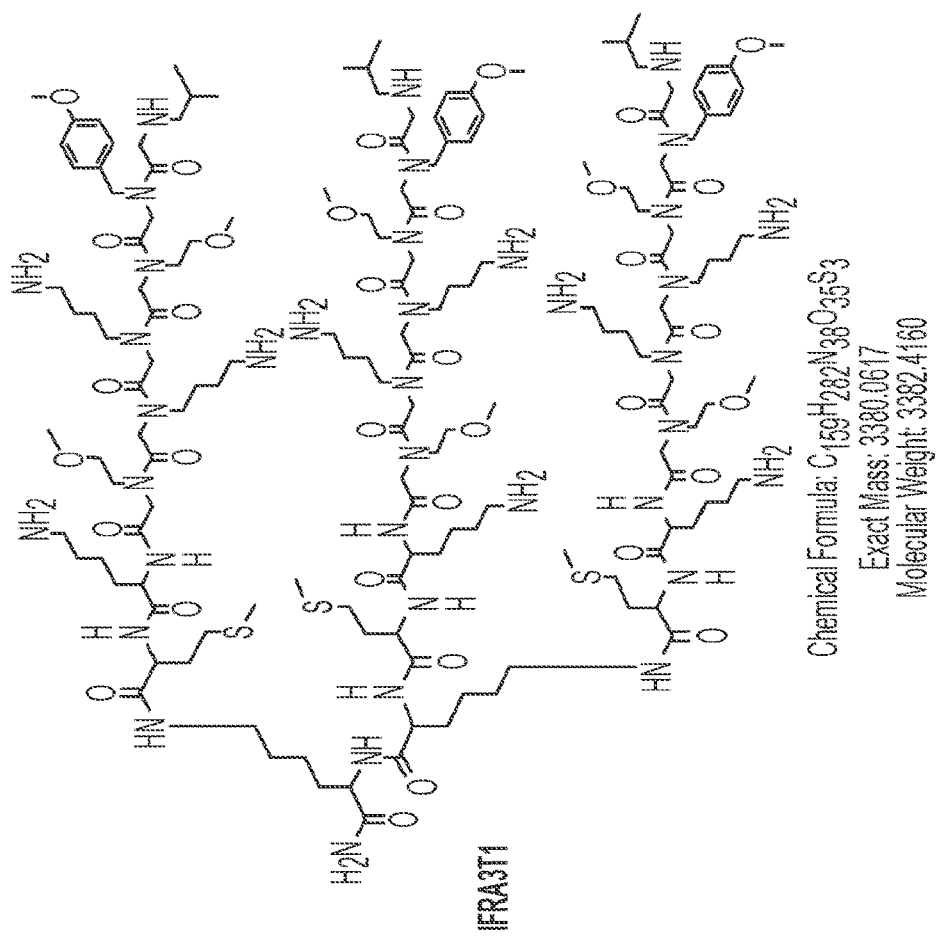
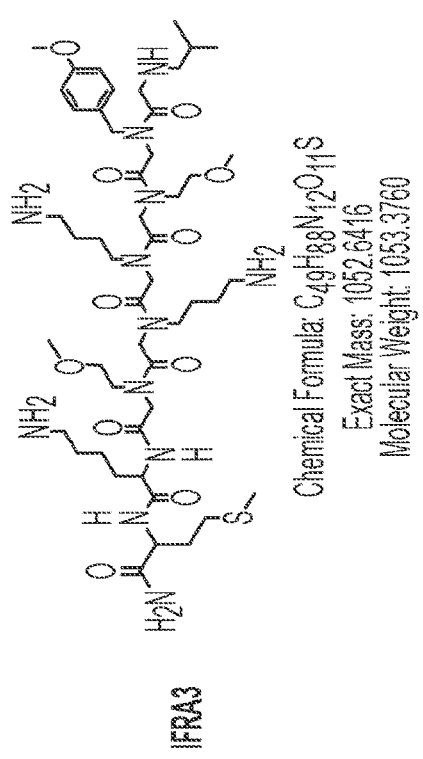
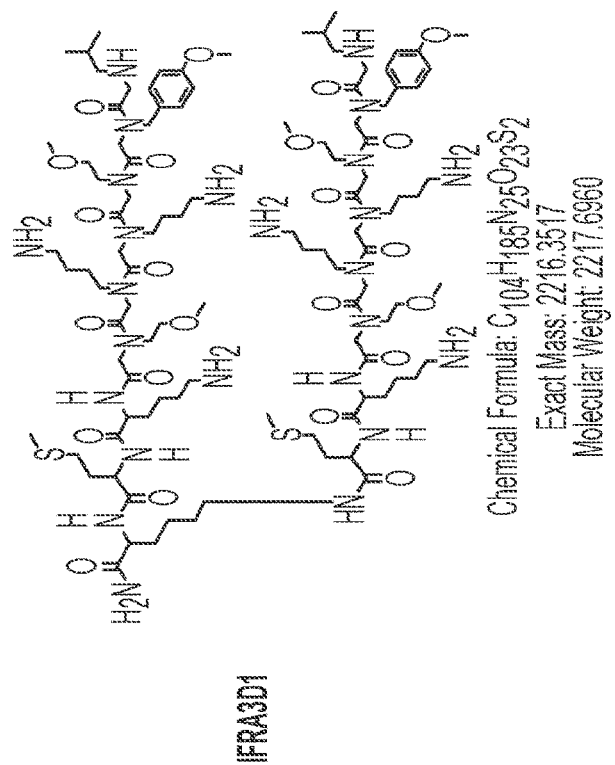
FIG. 4

IFRA3D2
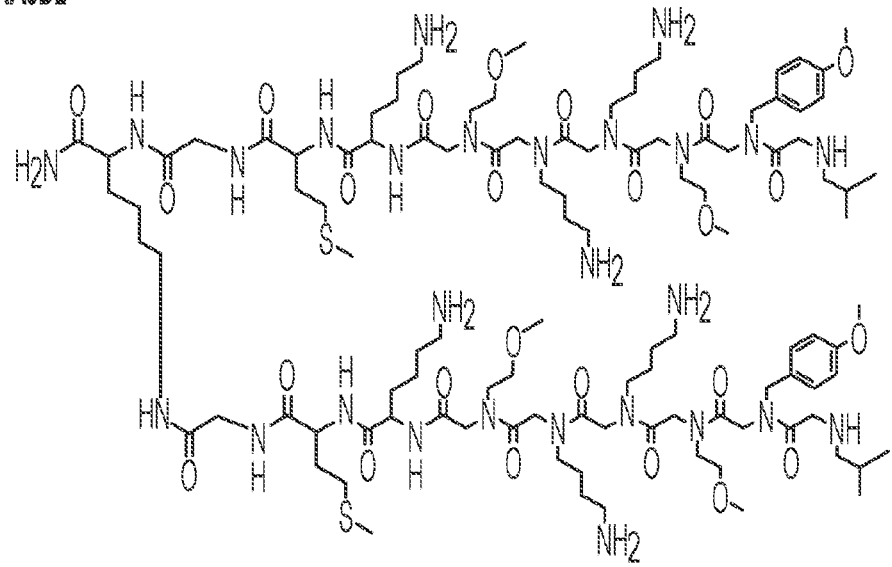
Chemical Formula: $C_{108}H_{191}N_{27}O_{25}S_2$
Exact Mass: 2330.3946
Molecular Weight: 2332.0000
IFRA3D3
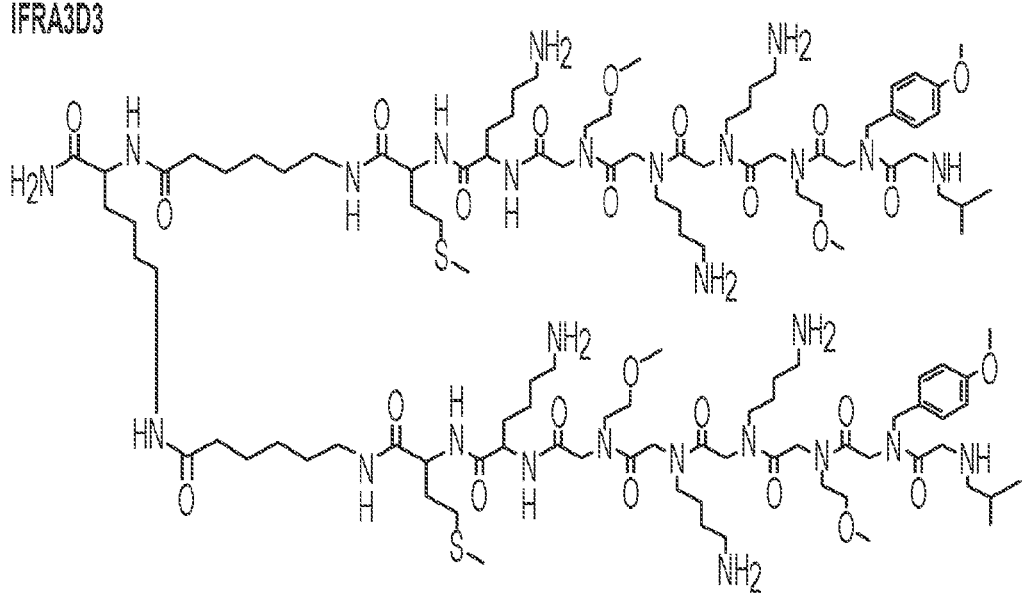
Chemical Formula: $C_{116}H_{207}N_{27}O_{25}S_2$
Exact Mass: 2442.5198
Molecular Weight: 2444.2160
FIG. 6

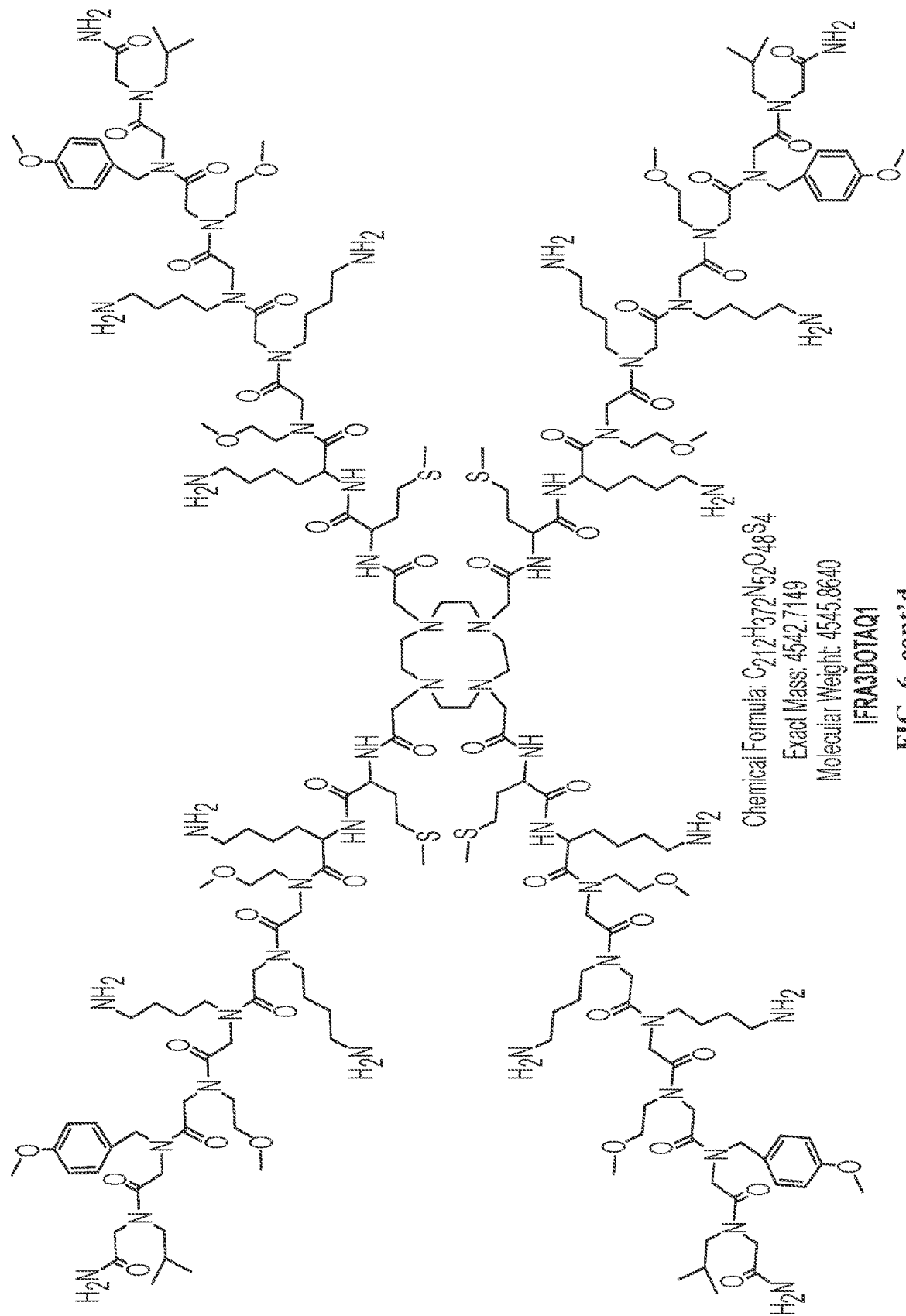
FIG. 6, cont'd

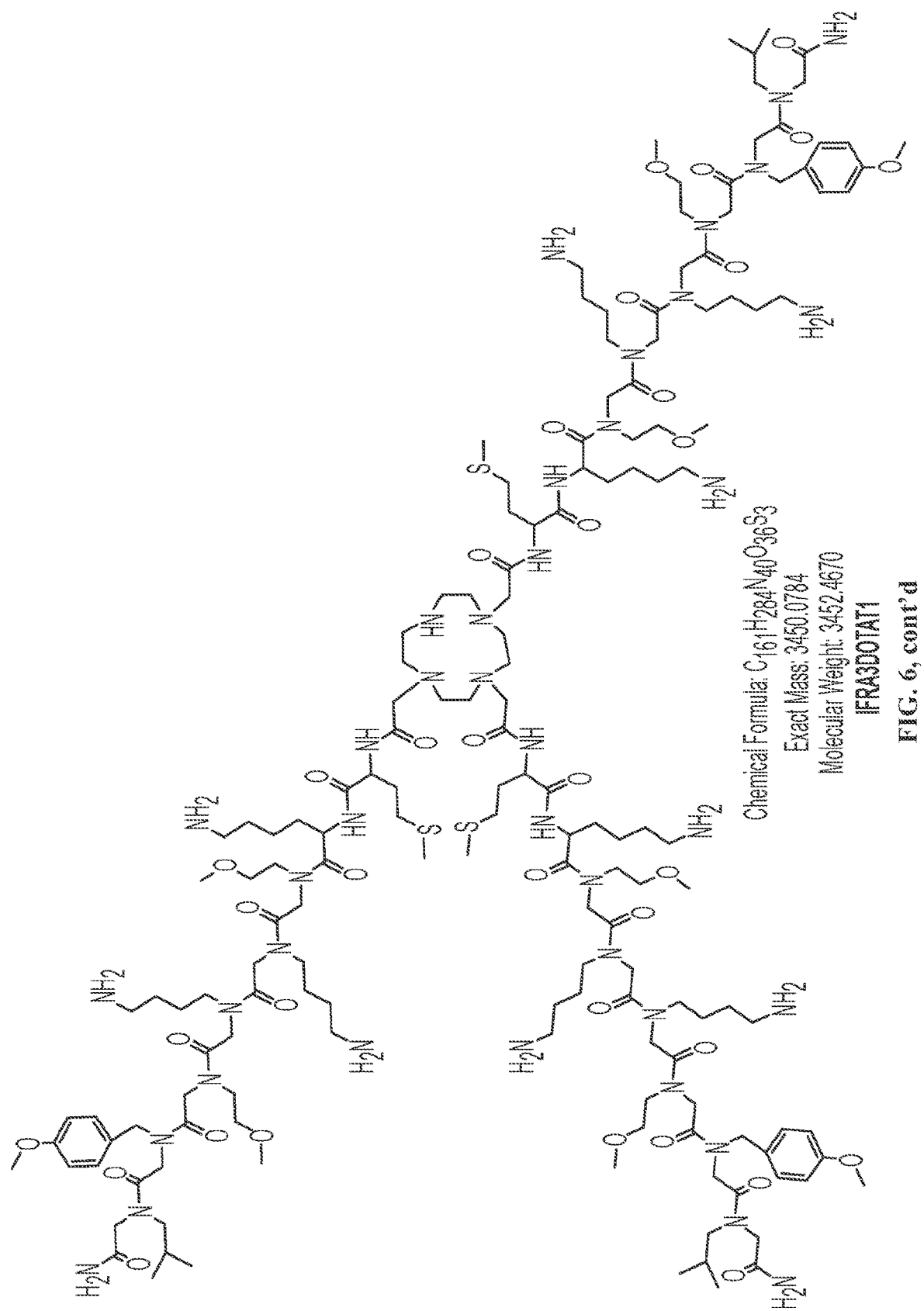
FIG. 6, cont'd

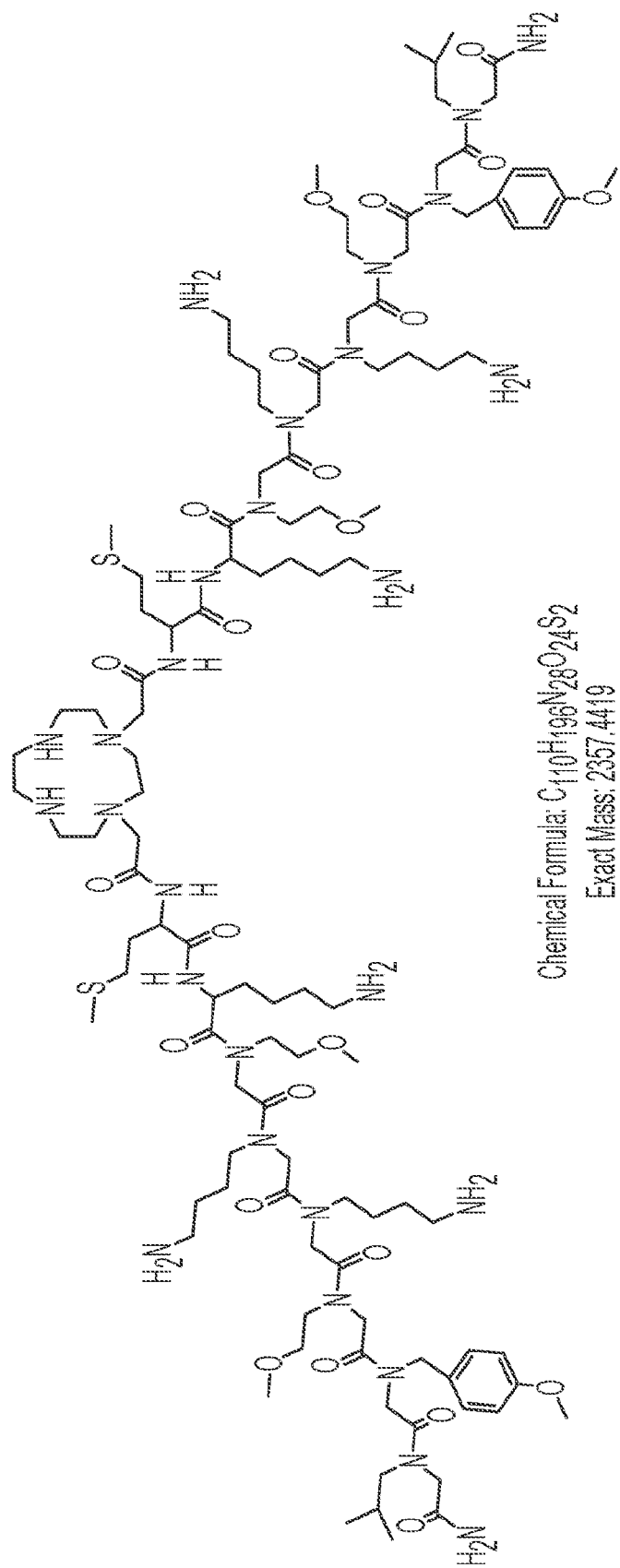
FIG. 6, cont'd

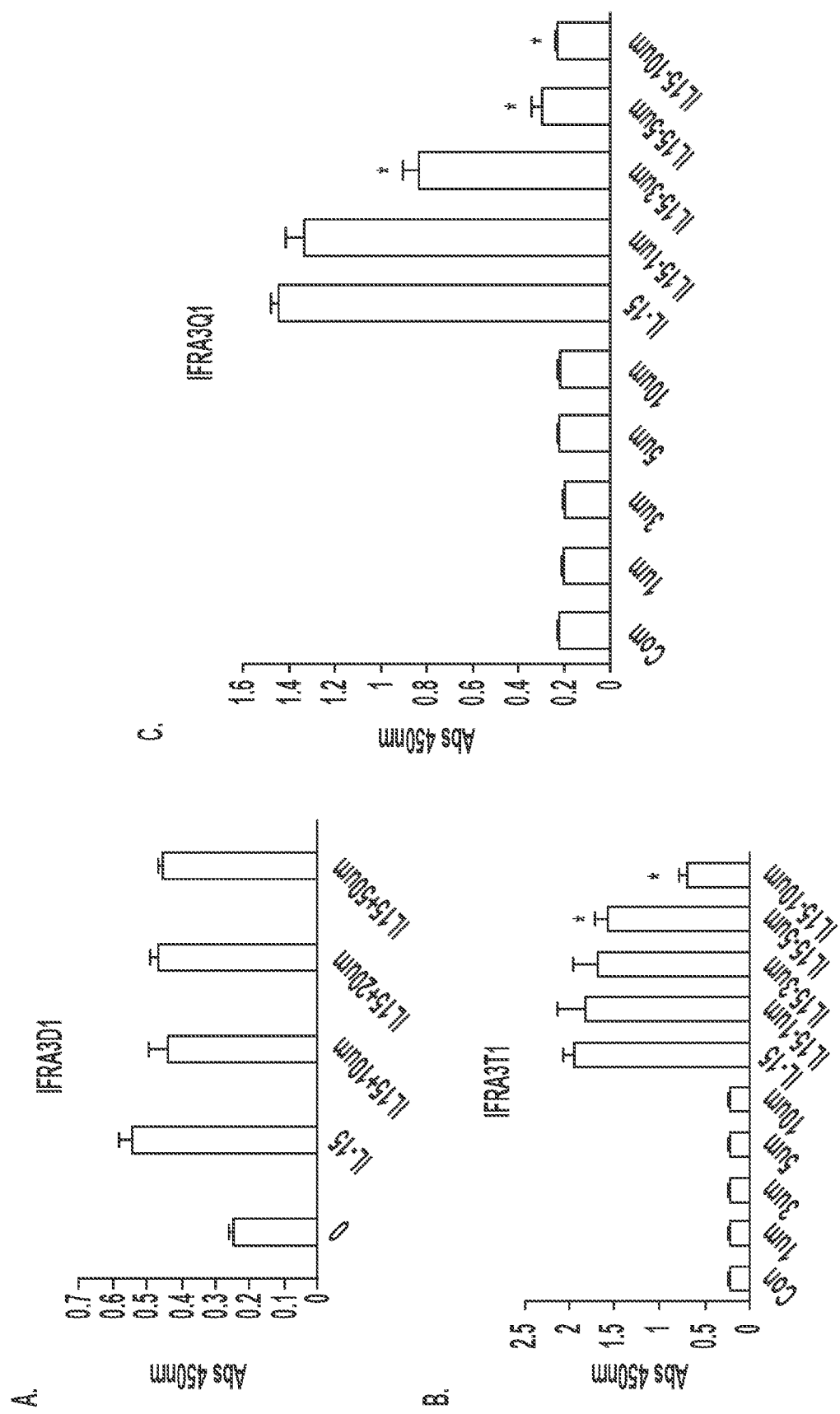
FIGS. 7A-C

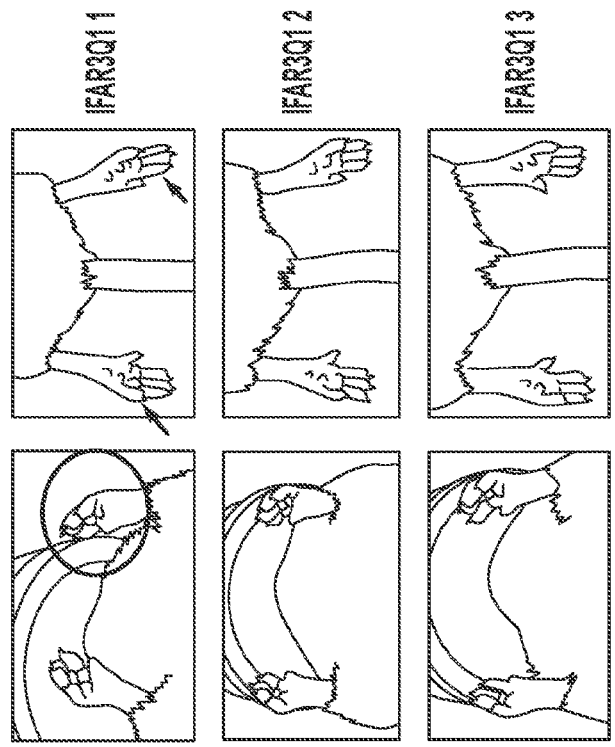
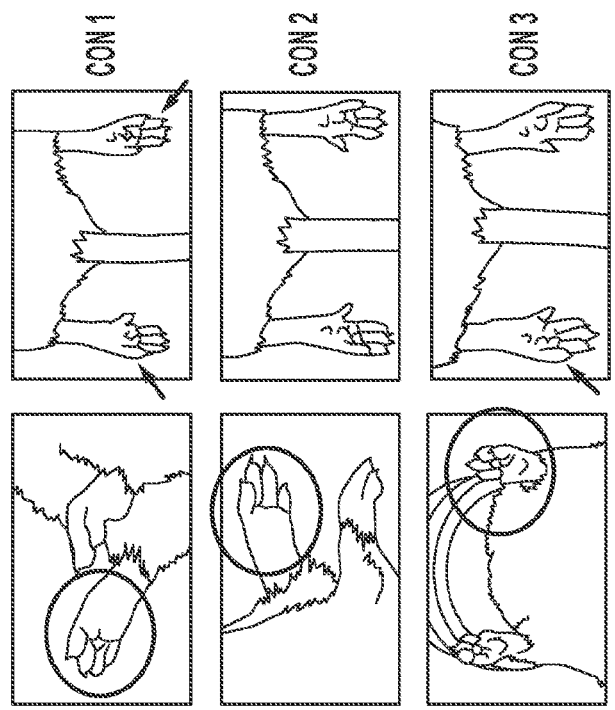
FIG. 17

| Mouse strain | Control | IFRA3Q1 | Week after CFA immunization |
|---|---|---|---|
| C57Bl/6 | 5/5 (100%) | 3/5 (60%) | 10th |
| DBA1/J | 3/4 (75%) | 1/3 (33%) | 10th |

FIG. 18

INHIBITORS OF IL-15 AND THEIR USE IN TREATING AUTOIMMUNE/INFLAMMATORY DISORDERS

PRIORITY CLAIM

This application claims benefit of priority to U.S. Provisional Application Ser. No. 62/870,318, filed Jul. 3, 2019, the entire contents of which are hereby incorporated by reference.

BACKGROUND

1. Field of the Disclosure

The present disclosure relates generally to the fields of biology, medicine, and immunology. More particular, the disclosure relates to peptoids and peptoid multimers for use in inhibiting IL-15 and treating autoimmune/inflammatory diseases and disorders.

2. Background

Inflammatory disorders encompass a wide variety of disease states ranging from cardiovascular disease, cancer and autoimmune disease. While inflammation is an important physiologic response to an insult to the body, and can provide a valuable defense to that insult, unchecked inflammation can be devastating to the subject.

One example of inflammation gone awry is autoimmunity. Autoimmune diseases arise from an abnormal immune response to a normal body part, often starting in young adulthood. There are at least 80 types of autoimmune diseases. Nearly any body part can be involved. Common symptoms include low grade fever and feeling tired. Often symptoms come and go. About 24 million (7%) people in the United States are affected by an autoimmune disease. Women are more commonly affected than men, and it has been estimated that autoimmune diseases are among the leading causes of death among women in the United States in all age groups up to 65 years.

The cause is generally unknown. Some autoimmune diseases such as lupus run in families, and certain cases may be triggered by infections or other environmental factors. Some common autoimmune diseases include celiac disease, diabetes mellitus type 1, Graves' disease, inflammatory bowel disease, multiple sclerosis, psoriasis, rheumatoid arthritis, and systemic lupus erythematosus. The diagnosis can be difficult to determine given the similar and overlapping symptoms, and the distinguishing causative factors for each of these diseases are still being sorted out.

Treatment depends on the type and severity of the condition. Nonsteroidal anti-inflammatory drugs (NSAIDs) and immunosuppressants are often used. Intravenous Immunoglobulin may also occasionally be used. While treatment usually improves symptoms, they do not typically cure the disease. A further challenge is being able to tailor a response to the particular aspects of an individual's disease. Thus, a therapeutic approach that was valid for all subject's with a given autoimmune disease would be extremely valuable, and an approach that was valid for multiple clinically distinct autoimmune diseases would be a remarkable advance in the care of patients afflicted with these maladies.

SUMMARY

Thus, in accordance with the present disclosure, there is provided a peptoid of the following structure:

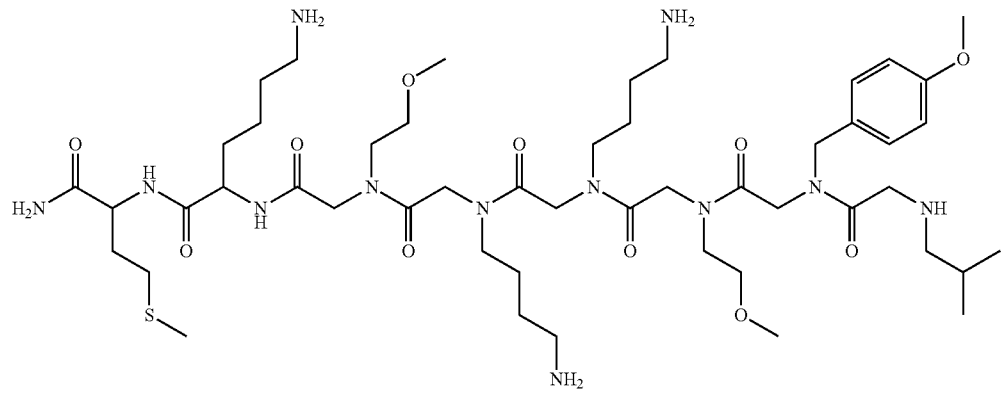 [SMILES: COCCN(CC(=O)NC(CCCCN)C(=O)NC(CCSC)C(N)=O)C(=O)CN(CCCCN)C(=O)CN(CCCCN)C(=O)CN(CCOC)C(=O)CN(Cc1ccc(OC)cc1)C(=O)CNCC(C)C]

or a multimer thereof. The multimer may be dimer, a trimer or a tetramer. The multimer may comprise peptoids linked through their N-terminus, their C-terminus, or through a mid-chain connection. The multimer may comprise peptoids linked through a straight chain lower alkyl or through a peptide or distinct peptoid. Multiple copies of said peptoid or peptoid multimer may be located on the surface of a particle, such as a bead. The multimer may have a structure selected from the group consisting of:

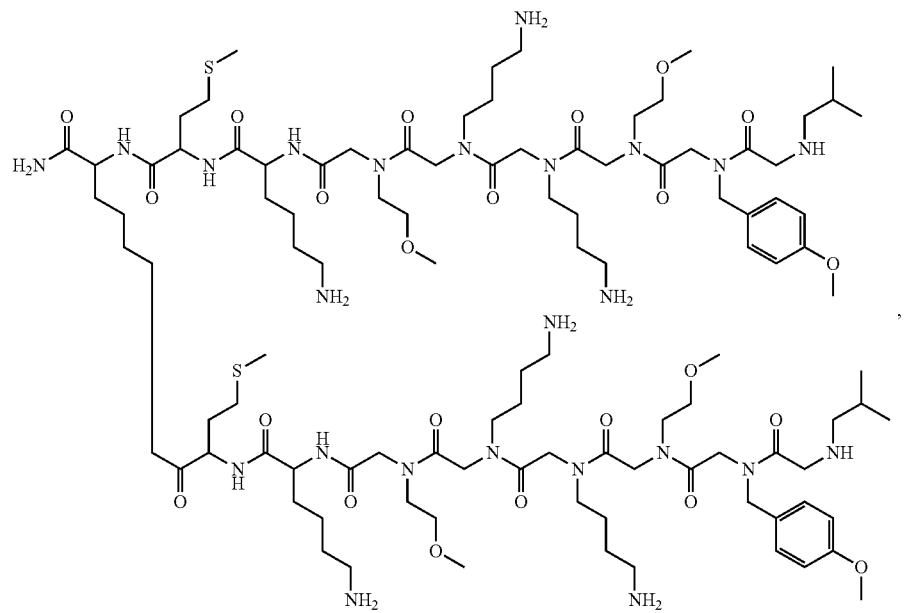
IFRA3D1
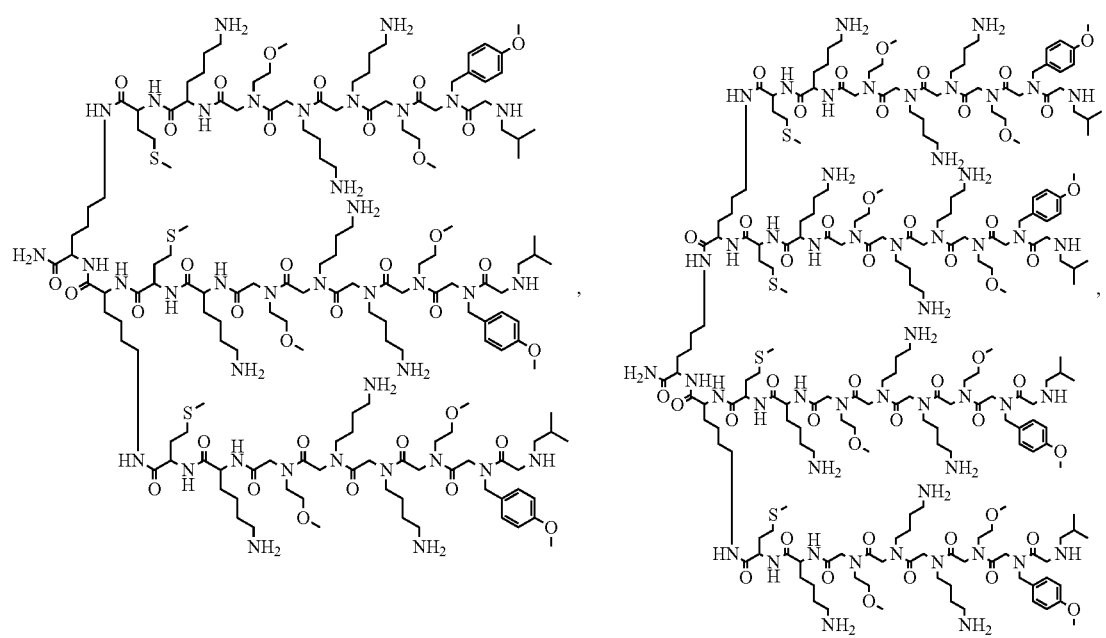
IFRA3T1, IFRA3Q1

-continued
IFRA3D2
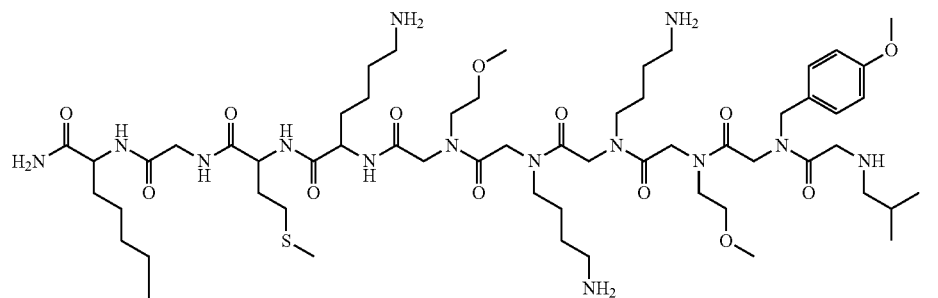
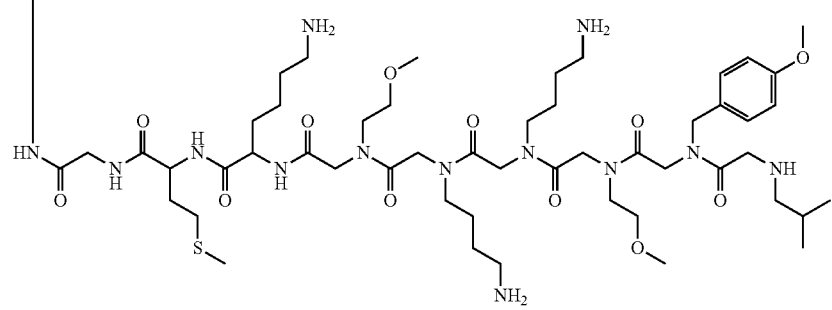
IFRA3D3
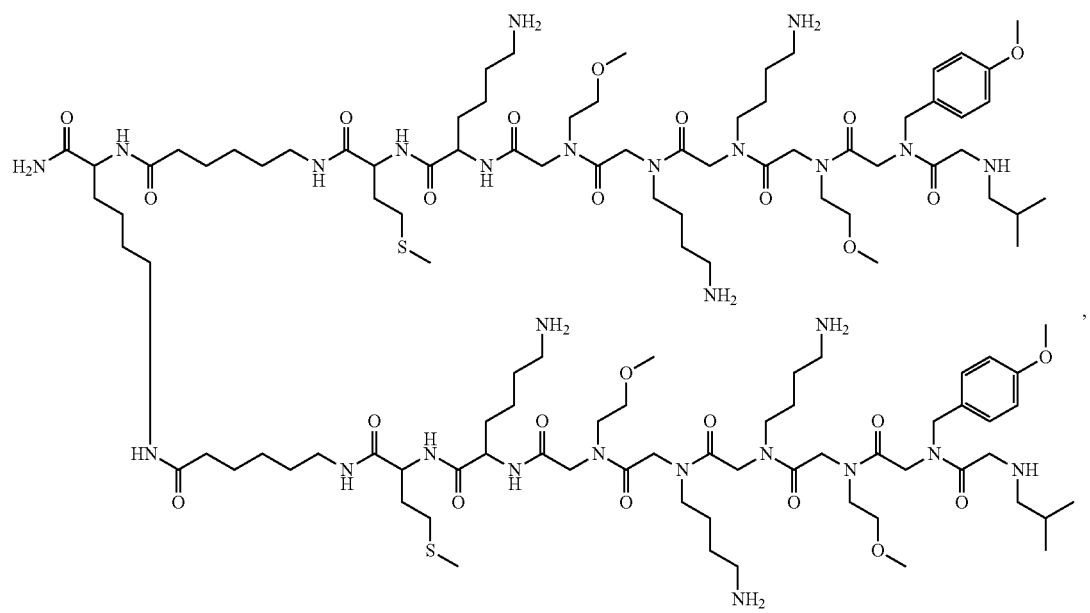

-continued
IFRA3DOTAQ1
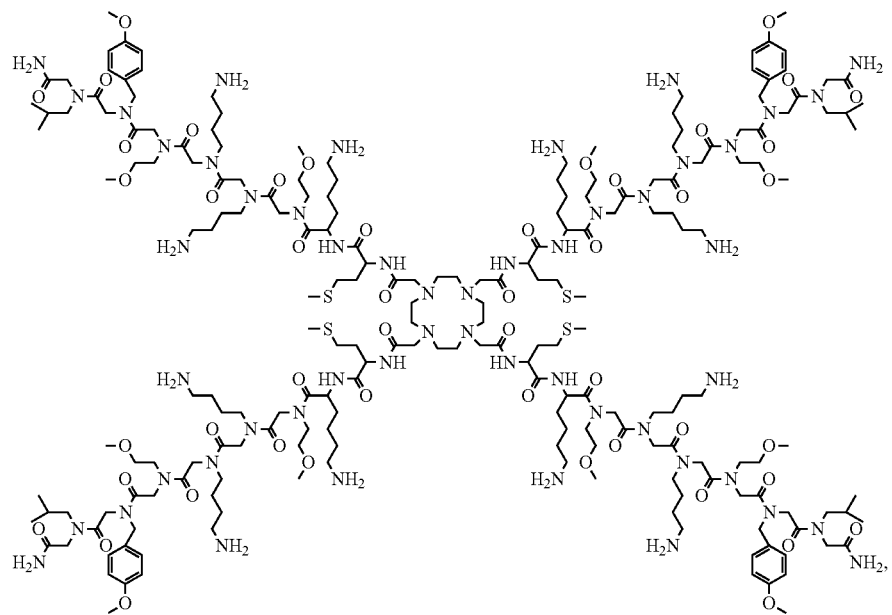
IFRA3DOTAT1
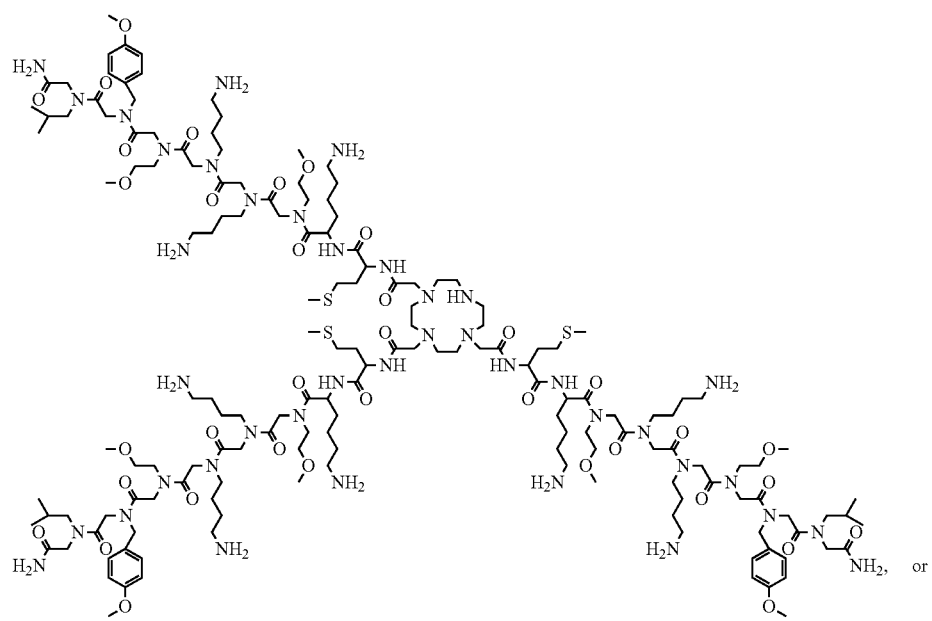
or
IFRA3DOTAD1
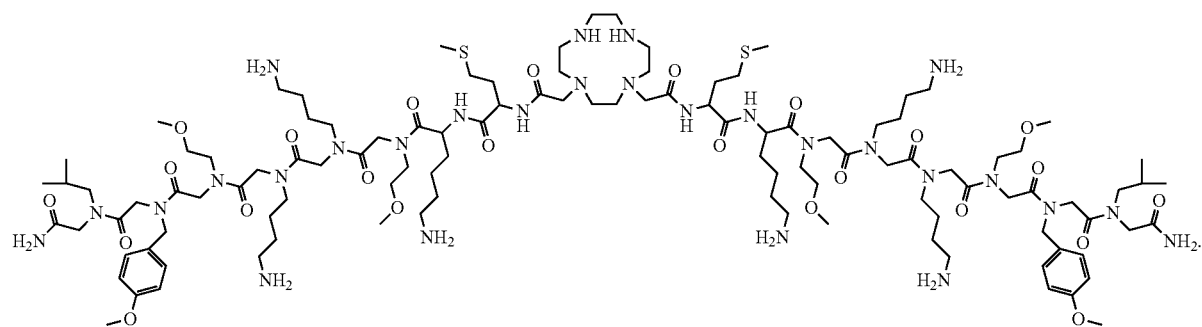

In another embodiment, there is provided a method of inhibiting IL-15 signaling in a subject comprising administering to said subject a peptoid of the following structure:

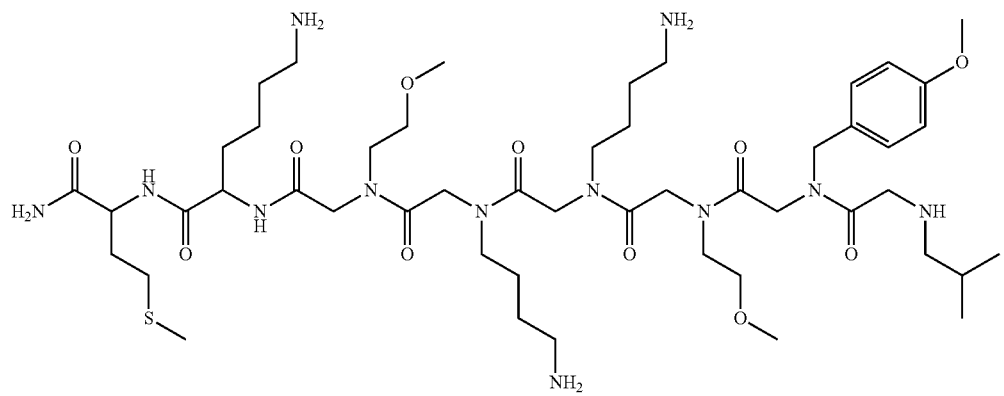 [SMILES: COCCN(CC(=O)NC(CCCCN)C(=O)NC(CCSC)C(N)=O)C(=O)CN(CCCCN)C(=O)CN(CCCCN)C(=O)CN(CCOC)C(=O)CN(Cc1ccc(OC)cc1)C(=O)CNCC(C)C]

or a multimer thereof. The multimer may be dimer, a trimer or a tetramer. The multimer may comprise peptoids linked through their N-terminus, their C-terminus, or through a mid-chain connection. The multimer may comprise peptoids linked through a straight chain lower alkyl or through a peptide or distinct peptoid. Multiple copies of said peptoid or peptoid multimer may be located on the surface of a particle, such as a bead.

The subject may suffer from an inflammatory disease or disorder, such as an autoimmune disease. The inflammatory disease or disorder may cause inflammation in the subject's liver, pancreas, salivary glands, ovaries, testes, skin, central nervous system, synovial tissue, gastrointestinal tract, thyroid, kidneys, lungs or eyes. The inflammatory disease or disorder/autoimmune disease may be atopic dermatitis, autoimmune hepatitis, autoimmune retinopathy, celiac disease, chronic transplant rejection, Churg-Strauss syndrome, Graves' disease, Graves' ophthalmopathy, inflammatory bowel disease, graft-versus-host disease, Hashimoto's disease, juvenile idiopathic arthritis, multiple sclerosis, myasthenia gravis, neuromyelitis optica, pemphigus vulgaris, psoriasis, rheumatoid arthritis, Sarcoidosis, Sjogren's syndrome, Systemic Scleroderma, systemic lupus erythematosus, or ulcerative colitis.

The subject may a human, such as a neonate, a pediatric patient, a teenager, an adult or a patient over about 60 years of age. The subject may be anon-human mammal. Administering may be chronic, such as daily, weekly, monthly, every other month, every three months, every four months, every five months, every six months, every nine months or every year. The method may further comprise administering to said subject a second therapy, such as a NSAID, a steroid (a corticosteroid), an immunosuppressive biologic (e.g., antibody), or an anti-metabolite (e.g., methotrexate). The multimer may have a structure selected from the group consisting of:

IFRA3D1

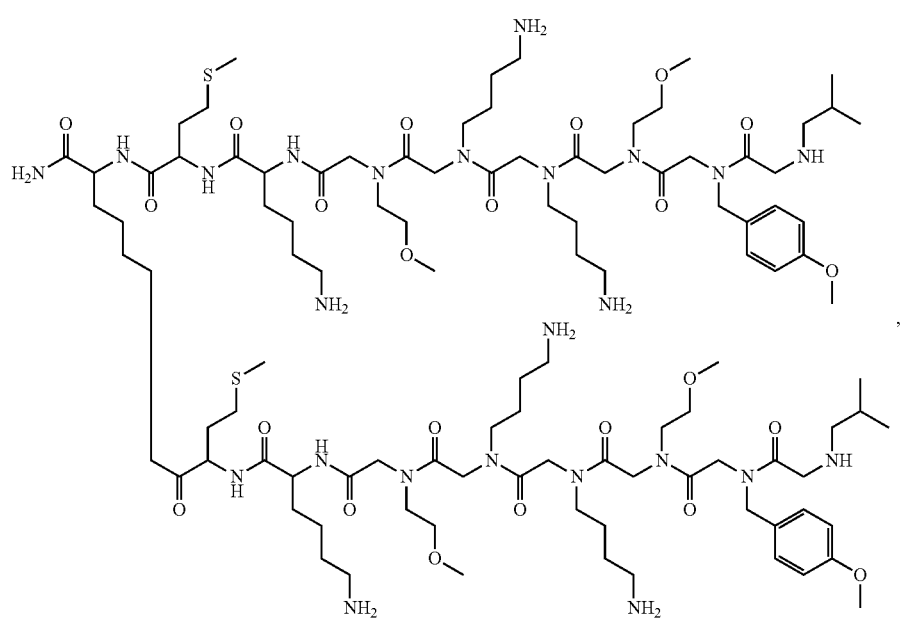

,

IFRA3T1
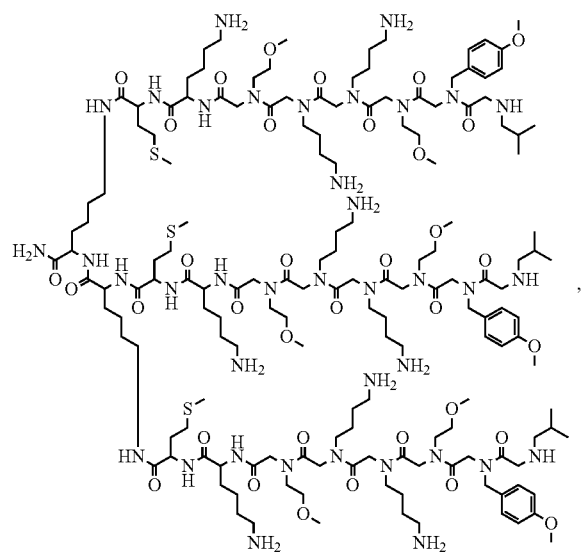
IFRA3Q1
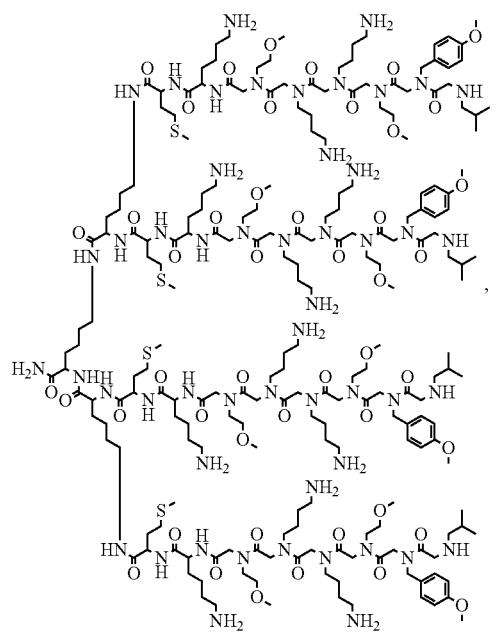
IFRA3D2
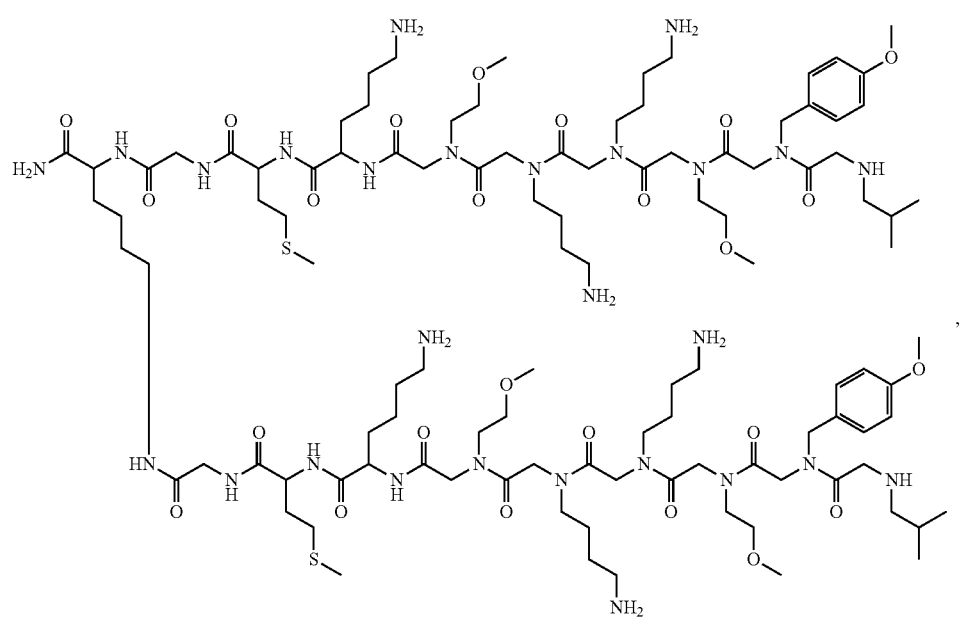

-continued
IFRA3D3
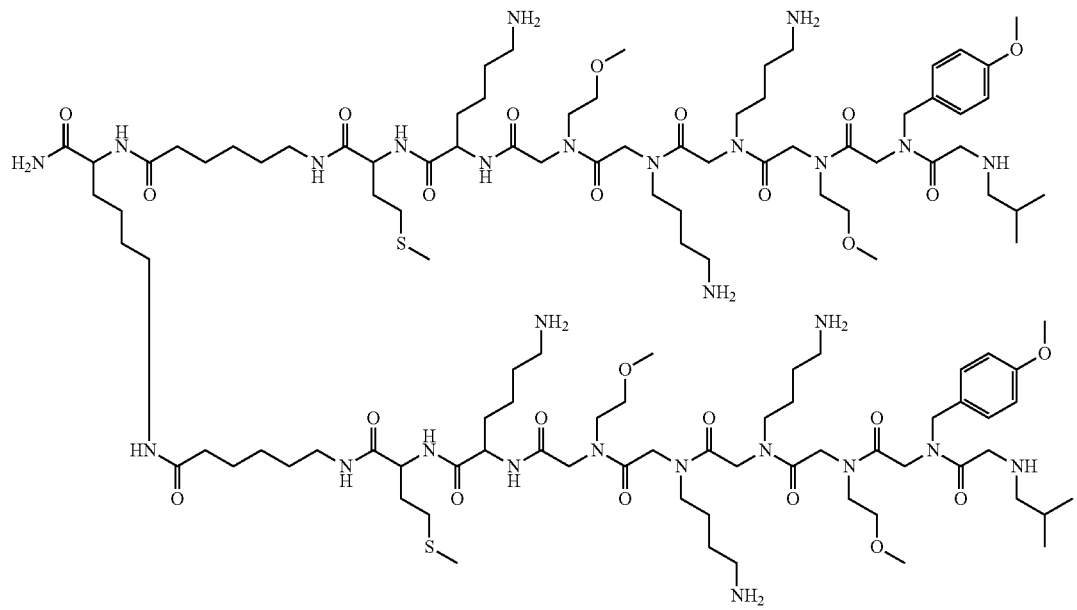
IFRA3DOTAQ1
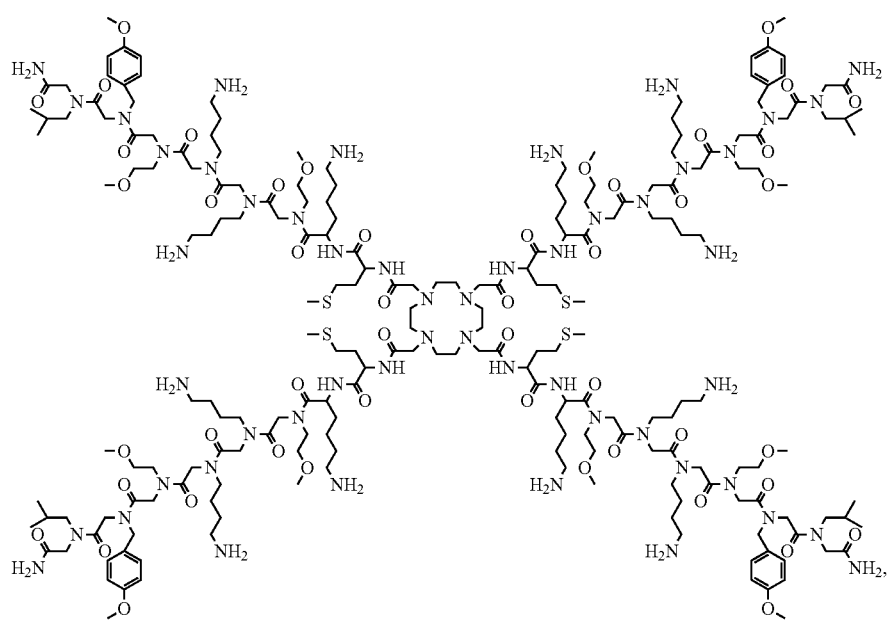

-continued

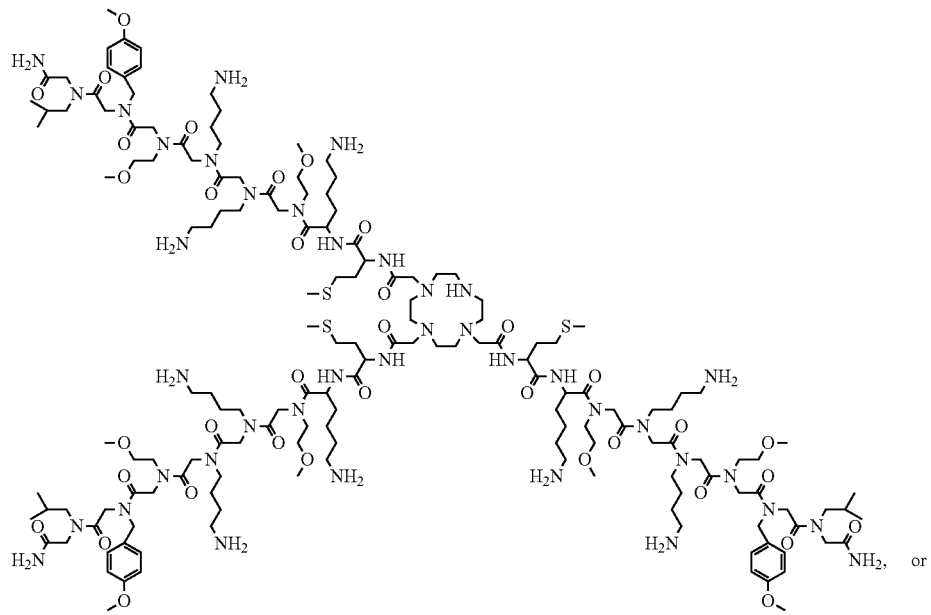

IFRA3DOTAT1

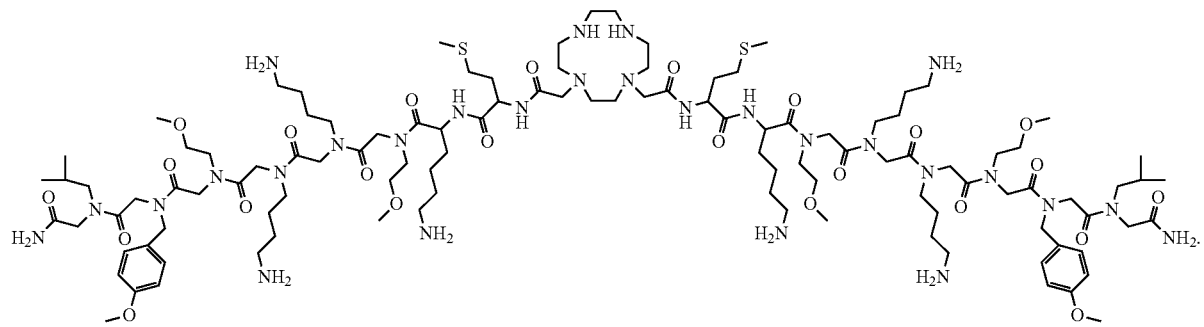

IFRA3DOTAD1

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIGS. 1A-C. Discovery of the IL-15 receptor a subunit-binding compound IFRA3 through OBTC screening of a peptoid library. To identify compounds that can bind to IL-15 receptor, the inventors performed an on-bead two-color (OBTC) screening experiment. HeLa cells expressing IL-15 Rα were stained with red Qdot® 565 nanocrystals and HeLa cells not expressing IL-15 Rα were stained with green Qdot® 565 nanocrystals. One million green cells and one million red cells were mixed and incubated for 1 hour with 50,000 peptoid compound library beads containing one-compound on one bead at 23° C. Beads that bind to only red cells but not green cells were isolated under fluorescent microscope and the compound attached to the bead was identified by mass spectrometry. (FIG. 1A) Illustration of the OBTC screening mechanism. (FIG. 1B) One example of the bead that binds only the red cells. (FIG. 1C) The chemical structure of IFRA3, one of the three hits discovered in this screening.

(FIG. 2A) The inventors performed an in vitro pull-down assay to demonstrate the interaction between IFRA3 and IL-15 receptor a (IL15RA). Cell lysates from IL-15RA positive HeLa cells (expressing IL15RA) or IL-15RA negative HeLa cells (transfected with IL15RA siRNA to knock down IL15RA) were incubated with beads conjugated with IFRA1, or IFRA2, or IFRA3 at 4° C.

overnight. The beads were then washed with RIPA buffer for 3 times, and the binding proteins were eluted with 1% SDS. The yielded lysates were then applied onto 12% SDS-PAGE gel and subjected to Coomassie blue staining. (FIG. 2B) Protein in the gel was transferred to membrane and identified by western blotting analysis with antibody against IL-15RA.

FIG. 4. Chemical structures of IFRA3 and multimer derivatives.

FIG. 6. Chemical structures of additional multimers.

FIGS. 7A-C. IFRA3Q1 inhibits the IL-15 activity. To determine if IFRA3 and its derivatives can regulate the function of IL-15, the inventors performed CTLL-2 proliferation assay. The proliferation of murine T cell line CTLL-2 depends on the presence and activity of IL-15. CTLL-2 cells were seeded into 96-well plates and treated with IL-15 in the presence or absence of IFRA3D1, IFRA3T1, or IFRA3Q1 at indicated concentrations for 72 hours. CTLL-2 cell proliferation was measured by WST-1 assay.

FIG. 17. Photo show arthritis in DBA1/J mice comparing control and IFRA3Q1 treatment groups. Control represents CIA without IFRA3Q1 treatment. IFRA3Q1 represents CIA and 100 µg IFRA3Q1, i.p., twice per week.

FIG. 18. Incidence of collagen-induced arthritis in two strains of mice. Incidence was calculated at 10th week after CFA immunization. Numerator indicates the number of mice formed arthritis and denominator indicates number of total mice.

DESCRIPTION OF ILLUSTRATIVE EMBODIMENTS

Figure 2B:
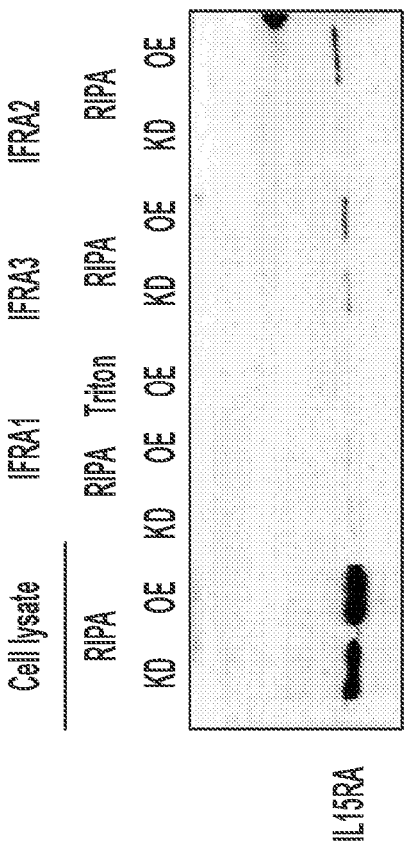
FIGS. 2A-B. Confirmation of the binding of IFRA3 to IL-15 receptor a subunit.

As discussed above, there remains a great need for improved therapies for autoimmune/inflammatory disease. Accordingly, peptoids and peptoid multimers are provided that inhibit IL-15 signaling and can provide an effective treatment for autoimmune/inflammatory disease. These and other aspects of the disclosure are described in detail below.

I. AUTOIMMUNE/INFLAMMATORY DISORDERS AND DISEASES

A. Inflammatory Disorders

Inflammation is part of the complex biological response of body tissues to harmful stimuli, such as pathogens, damaged cells, or irritants, and is a protective response involving immune cells, blood vessels, and molecular mediators. The function of inflammation is to eliminate the initial cause of cell injury, clear out necrotic cells and tissues damaged from the original insult and the inflammatory process, and initiate tissue repair.

The five classical signs of inflammation are heat, pain, redness, swelling, and loss of function. Inflammation is a generic response, and therefore it is considered as a mechanism of innate immunity, as compared to adaptive immunity, which is specific for each pathogen. Too little inflammation could lead to progressive tissue destruction by the harmful stimulus (e.g., bacteria) and compromise the survival of the organism. In contrast, chronic inflammation is associated with various diseases, such as hay fever, periodontal disease, atherosclerosis, and osteoarthritis.

Inflammation can be classified as either acute or chronic. Acute inflammation is the initial response of the body to harmful stimuli and is achieved by the increased movement of plasma and leukocytes (especially granulocytes) from the blood into the injured tissues. A series of biochemical events propagates and matures the inflammatory response, involving the local vascular system, the immune system, and various cells within the injured tissue. Prolonged inflammation, known as chronic inflammation, leads to a progressive shift in the type of cells present at the site of inflammation, such as mononuclear cells, and is characterized by simultaneous destruction and healing of the tissue from the inflammatory process.

Inflammatory abnormalities are a large group of disorders that underlie a vast variety of human diseases. The immune system is often involved with inflammatory disorders, demonstrated in both allergic reactions and some myopathies, with many immune system disorders resulting in abnormal inflammation. Non-immune diseases with causal origins in inflammatory processes include cancer, atherosclerosis, and ischemic heart disease. Examples of disorders associated with inflammation include acne vulgaris, asthma, autoimmune diseases (discussed below), autoinflammatory diseases, chronic prostatitis, colitis, diverticulitis, glomerulonephritis, hidradenitis suppurativa, hypersensitivities, interstitial cystitis, lichen planus, mast cell activation syndrome, mastocytosis, otitis, pelvic inflammatory disease, reperfusion injury, rheumatic fever, rhinitis, sarcoidosis, transplant rejection, and vasculitis. Others are discussed below.

Atherosclerosis. Atherosclerosis, formerly considered a bland lipid storage disease, actually involves an ongoing inflammatory response. Recent advances in basic science have established a fundamental role for inflammation in mediating all stages of this disease from initiation through progression and, ultimately, the thrombotic complications of atherosclerosis. These new findings provide important links between risk factors and the mechanisms of atherogenesis. Clinical studies have shown that this emerging biology of inflammation in atherosclerosis applies directly to human patients. Elevation in markers of inflammation predicts outcomes of patients with acute coronary syndromes, independently of myocardial damage. In addition, low-grade chronic inflammation, as indicated by levels of the inflammatory marker C-reactive protein, prospectively defines risk of atherosclerotic complications, thus adding to prognostic information provided by traditional risk factors. Moreover, certain treatments that reduce coronary risk also limit inflammation. In the case of lipid lowering with statins, this anti-inflammatory effect does not appear to correlate with reduction in low-density lipoprotein levels. These new insights into inflammation in atherosclerosis not only increase our understanding of this disease but also have practical clinical applications in risk stratification and targeting of therapy for this scourge of growing worldwide importance.

Allergy. An allergic reaction, formally known as type 1 hypersensitivity, is the result of an inappropriate immune response triggering inflammation, vasodilation, and nerve irritation. A common example is hay fever, which is caused by a hypersensitive response by mast cells to allergens. Pre-sensitized mast cells respond by degranulating, releasing vasoactive chemicals such as histamine. These chemicals propagate an excessive inflammatory response characterized by blood vessel dilation, production of pro-inflammatory molecules, cytokine release, and recruitment of leukocytes. Severe inflammatory response may mature into a systemic response known as anaphylaxis.

Myopathies. Inflammatory myopathies are caused by the immune system inappropriately attacking components of muscle, leading to signs of muscle inflammation. They may occur in conjunction with other immune disorders, such as systemic sclerosis, and include dermatomyositis, polymyositis, and inclusion body myositis.

Leukocyte defects. Due to the central role of leukocytes in the development and propagation of inflammation, defects in leukocyte functionality often result in a decreased capacity for inflammatory defense with subsequent vulnerability to infection. Dysfunctional leukocytes may be unable to correctly bind to blood vessels due to surface receptor mutations, digest bacteria (Chédiak-Higashi syndrome), or produce microbicides (chronic granulomatous disease). In addition, diseases affecting the bone marrow may result in abnormal or few leukocytes.

Pharmacological. Certain drugs or exogenous chemical compounds are known to affect inflammation. Vitamin A deficiency causes an increase in inflammatory responses, and anti-inflammatory drugs work specifically by inhibiting the enzymes that produce inflammatory eicosanoids. Certain illicit drugs such as cocaine and ecstasy may exert some of their detrimental effects by activating transcription factors intimately involved with inflammation (e.g., NF-κB).

Cancer. Inflammation orchestrates the microenvironment around tumours, contributing to proliferation, survival and migration. Cancer cells use selectins, chemokines and their receptors for invasion, migration and metastasis. On the other hand, many cells of the immune system contribute to cancer immunology, suppressing cancer. Molecular intersection between receptors of steroid hormones, which have important effects on cellular development, and transcription factors that play key roles in inflammation, such as NF-κB, may mediate some of the most critical effects of inflammatory stimuli on cancer cells. This capacity of a mediator of inflammation to influence the effects of steroid hormones in cells, is very likely to affect carcinogenesis on the one hand; on the other hand, due to the modular nature of many steroid hormone receptors, this interaction may offer ways to interfere with cancer progression, through targeting of a specific protein domain in a specific cell type. Such an approach may limit side effects that are unrelated to the tumor of interest and may help preserve vital homeostatic functions and developmental processes in the organism.

HIV and AIDS. It has long been recognized that infection with HIV is characterized not only by development of profound immunodeficiency but also by sustained inflammation and immune activation. A substantial body of evidence implicates chronic inflammation as a critical driver of immune dysfunction, premature appearance of aging-related diseases, and immune deficiency. Many now regard HIV infection not only as an evolving virus-induced immunodeficiency but also as chronic inflammatory disease. Even after the introduction of effective antiretroviral therapy (ART) and effective suppression of viremia in HIV-infected individuals, chronic inflammation persists. Animal studies also support the relationship between immune activation and progressive cellular immune deficiency: SIVsm infection of its natural nonhuman primate hosts, the sooty mangabey, causes high-level viral replication but limited evidence of disease. This lack of pathogenicity is accompanied by a lack of inflammation, immune activation and cellular proliferation. In sharp contrast, experimental SIVsm infection of rhesus macaque produces immune activation and AIDS-like disease with many parallels to human HIV infection.

Delineating how CD4 T cells are depleted and how chronic inflammation and immune activation are induced lies at the heart of understanding HIV pathogenesis-one of the top priorities for HIV research by the Office of AIDS Research, National Institutes of Health. Recent studies demonstrated that caspase-1-mediated pyroptosis, a highly inflammatory form of programmed cell death, drives CD4 T-cell depletion and inflammation by HIV. These are the two signature events that propel HIV disease progression to AIDS. Pyroptosis appears to create a pathogenic vicious cycle in which dying CD4 T cells and other immune cells (including macrophages and neutrophils) release inflammatory signals that recruit more cells into the infected lymphoid tissues to die. The feed-forward nature of this inflammatory response produces chronic inflammation and tissue injury. Identifying pyroptosis as the predominant mechanism that causes CD4 T-cell depletion and chronic inflammation, provides novel therapeutic opportunities, namely caspase-1 which controls the pyroptotic pathway. In this regard, pyroptosis of CD4 T cells and secretion of pro-inflammatory cytokines such as IL-1β and IL-18 can be blocked in HIV-infected human lymphoid tissues by addition of the caspase-1 inhibitor VX-765, which has already proven to be safe and well tolerated in phase II human clinical trials. These findings could propel development of an entirely new class of "anti-AIDS" therapies that act by targeting the host rather than the virus. Such agents would almost certainly be used in combination with ART. By promoting "tolerance" of the virus instead of suppressing its replication, VX-765 or related drugs may mimic the evolutionary solutions occurring in multiple monkey hosts (e.g., the sooty mangabey) infected with species-specific lentiviruses that have led to a lack of disease, no decline in CD4 T-cell counts, and no chronic inflammation.

Depression. There is evidence for a link between inflammation and depression. Inflammatory processes can be triggered by negative cognitions or their consequences, such as stress, violence, or deprivation. Thus, negative cognitions can cause inflammation that can, in turn, lead to depression. In addition, there is increasing evidence that inflammation can cause depression because of the increase of cytokines, setting the brain into a "sickness mode." Classical symptoms of being physically sick like lethargy show a large overlap in behaviors that characterize depression. Levels of cytokines tend to increase sharply during the depressive episodes of people with bipolar disorder and drop off during remission. Furthermore, it has been shown in clinical trials that anti-inflammatory medicines taken in addition to antidepressants not only significantly improves symptoms but also increases the proportion of subjects positively responding to treatment. Inflammations that lead to serious depression could be caused by common infections such as those caused by a virus, bacteria or even parasites.

B. Autoimmune Diseases

As discussed above, an autoimmune disease is an inflammatory condition arising from an abnormal immune response to a normal body part. A substantial minority of the population suffers from these diseases, which are often chronic, debilitating, and life-threatening.

For a disease to be regarded as an autoimmune disease it needs to answer to Witebsky's postulates:
   direct evidence from transfer of disease-causing antibody or disease-causing T lymphocyte white blood cells;
   indirect evidence based on reproduction of the autoimmune disease in experimental animals;
   circumstantial evidence from clinical clues;
   genetic evidence suggesting "clustering" with other autoimmune diseases, autoimmune diseases are incurable Autoimmune diseases have a wide variety of different effects. They do tend to have one of three characteristic pathological effects which characterize them as autoimmune diseases:
   damage to or destruction of tissues
   altered organ growth
   altered organ function There are more than 80 illnesses caused by autoimmunity.

Autoimmune diseases affect approximately 2-5% of the western world's population. Women are found to be more commonly affected than men. Environmental events can trigger some cases of autoimmune diseases such as exposure to radiation or certain drugs which can damage tissues of the body. Infection can also be a trigger of some autoimmune diseases for example Lupus which is thought to be a milder version of an idiopathic disorder where there is an increased production of antihistone antibodies.

The human immune system typically produces both T-cells and B-cells that are capable of being reactive with self-antigens, but these self-reactive cells are usually either killed prior to becoming active within the immune system, placed into a state of anergy (silently removed from their role within the immune system due to over-activation), or removed from their role within the immune system by regulatory cells. When any one of these mechanisms fail, it is possible to have a reservoir of self-reactive cells that become functional within the immune system. The mechanisms of preventing self-reactive T-cells from being created takes place through Negative selection process within the thymus as the T-cell is developing into a mature immune cell.

Some infections, such as *Campylobacter jejuni*, have antigens that are similar (but not identical) to human molecules. In this case, a normal immune response to *C. jejuni* can result in the production of antibodies that also react to a lesser degree with receptors on skeletal muscle (i.e., Myasthenia gravis). A major understanding of the underlying pathophysiology of autoimmune diseases has been the application of genome wide association scans that have identified a degree of genetic sharing among the autoimmune diseases. Autoimmunity, on the other hand, is the presence of self-reactive immune response (e.g., auto-antibodies, self-reactive T-cells), with or without damage or pathology resulting from it. This may be restricted to certain organs or involve a particular tissue in different places.

Some examples of autoimmune disorders include ankylosing spondylitis, arthritis, rheumatoid arthritis, osteoarthritis, Chagas disease, dermatomyositis, diabetes mellitus type 1, endometriosis, Goodpasture's syndrome, Graves' disease, Guillain-Barre syndrome, Hashimoto's thyroiditis disease, Hidradenitis suppurativa, Kawasaki disease, IgA nephropathy, Idiopathic thrombocytopenic purpura, inflammatory bowel disease, Celiac's disease, Crohn's disease, eosinophilic gastroenteritis, ulcerative colitis, collagenous colitis, lymphocytic colitis, ischemic colitis, diversion colitis, Behcet's syndrome, infective colitis, indeterminate colitis interstitial cystitis, lupus, systemic lupus erythematosus, discoid lupus, drug-induced lupus, neonatal lupus, mixed connective tissue disease, morphea, multiple sclerosis, myasthenia gravis, narcolepsy, neuromyotonia, pemphigus vulgaris, pernicious anemia, psoriasis, psoriatic arthritis, polymyositis, primary biliary cirrhosis, relapsing polychondritis, scleroderma, Sjogren's syndrome, Stiff person syndrome, temporal arteritis (also known as giant cell arteritis), vasculitis, vitiligo, Wegener's granulomatosis, alopecia areata, sarcoidosis, Addison's disease, or autoimmune hemolytic anemia.

In general, autoimmune diseases are treated using anti-inflammatory drugs and biologics that impair the stimulation of the immune cells that cause the disease, or that block the effects of molecules produced by immune cells once stimulated. Such agents include steroids, non-steroidal anti-inflammatory drugs, and antibodies that block immune receptors or immune effector molecules.

II. IL-5 AND IL-15Rα

A. IL-15

Interleukin-15 (IL-15) is a cytokine with structural similarity to Interleukin-2 (IL-2). Like IL-2, IL-15 binds to and signals through a complex composed of IL-2/IL-15 receptor beta chain (CD122) and the common gamma chain (gamma-C, CD132). IL-15 is secreted by mononuclear phagocytes (and some other cells) following infection by virus(es). This cytokine induces cell proliferation of natural killer cells; cells of the innate immune system whose principal role is to kill virally infected cells. It has also been reported to play a role in celiac disease and non-alcoholic fatty liver disease.

IL-15 was discovered in 1994 by two different laboratories and characterized as T cell growth factor. Together with Interleukin-2 (IL-2), Interleukin-4 (IL-4), Interleukin-7 (IL-7), Interleukin-9 (IL-9), granulocyte colony-stimulating factor (G-CSF), and granulocyte-macrophage colony-stimulating factor (GM-CSF), IL-15 belongs to the four α-helix bundle family of cytokine.

IL-15 is constitutively expressed by a large number of cell types and tissues, including monocytes, macrophages, dendritic cells (DC), keratinocytes, fibroblasts, myocyte and nerve cells. As a pleiotropic cytokine, it plays an important role in innate and adaptive immunity.

IL-15 is 14-15 kDa glycoprotein encoded by the 34 kb region of chromosome 4q31 in humans, and at the central region of chromosome 8 in mice. The human IL-15 gene comprises nine exons (1-8 and 4A) and eight introns, four of which (exons 5 through 8) code for the mature protein.

Two alternatively spliced transcript variants of this gene encoding the same protein have been reported. The originally identified isoform, with long signal peptide of 48 amino acids (IL-15 LSP) consisted of a 316 bp 5'-untranslated region (UTR), 486 bp coding sequence and the C-terminus 400 bp 3'-UTR region. The other isoform (IL-15 SSP) has a short signal peptide of 21 amino acids encoded by exons 4A and 5. Both isoforms shared 11 amino acids between signal sequences of the N-terminus. Although both isoforms produce the same mature protein, they differ in their cellular trafficking. IL-15 LSP isoform was identified in Golgi apparatus [GC], early endosomes and in the endoplasmic reticulum (ER). It exists in two forms, secreted and membrane-bound particularly on dendritic cells. On the other hand, IL-15 SSP isoform is not secreted and it appears to be restricted to the cytoplasm and nucleus where plays an important role in the regulation of cell cycle.

It has been demonstrated that two isoforms of IL-15 mRNA are generated by alternatively splicing in mice. The isoform which had an alternative exon 5 containing another 3' splicing site, exhibited a high translational efficiency, and the product lack hydrophobic domains in the signal sequence of the N-terminus. This suggests that the protein derived from this isoform is located intracellularly. The other isoform with normal exon 5, which is generated by integral splicing of the alternative exon 5, may be released extracellularly.

Although IL-15 mRNA can be found in many cells and tissues including mast cells, cancer cells or fibroblasts, this cytokine is produced as a mature protein mainly by dendritic cells, monocytes and macrophages. This discrepancy between the wide appearance of IL-15 mRNA and limited production of protein might be explained by the presence of the twelve in humans and five in mice upstream initiating codons, which can repress translation of IL-15 mRNA. Translational inactive mRNA is stored within the cell and can be induced upon specific signal. Expression of IL-15 can be stimulated by cytokine such as GM-CSF, double-strand mRNA, unmethylated CpG oligonucleotides, lipopolysaccharide (LPS) through Toll-like receptors (TLR), interferon gamma (IFN-γ) or after infection of monocytes herpes virus, *Mycobacterium tuberculosis* and *Candida albicans*.

IL-15 regulates the activation and proliferation of T and natural killer (NK) cells. Survival signals that maintain memory T cells in the absence of antigen are provided by IL-15. This cytokine is also implicated in NK cell development. In rodent lymphocytes, IL-15 prevents apoptosis by inducing BCL2L1/BCL-x(L), an inhibitor of the apoptosis pathway. In humans with celiac disease IL-15 similarly suppresses apoptosis in T-lymphocytes by inducing Bcl-2 and/or Bcl-xL.

A hematopoietin receptor, the IL-15 receptor, that binds IL-15 propagates its function. Some subunits of the IL-15 receptor are shared in common with the receptor for a structurally related cytokine called Interleukin 2 (IL-2) allowing both cytokines to compete for and negatively regulate each other's activity. CD8+ memory T cell number is controlled by a balance between IL-15 and IL-2. When IL-15 binds its receptor, JAK kinase, STAT3, STAT5, and STAT6 transcription factors are activated to elicit downstream signaling events.

IL-15 and its receptor subunit alpha (IL-15Rα) are also produced by skeletal muscle in response to different exercise doses (myokine), playing significant roles in visceral (intra-abdominal or interstitial) fat reduction and myofibrillar protein synthesis (hypertrophy).

B. IL-15Rα

Interleukin 15 receptor, alpha subunit is a subunit of the interleukin 15 receptor that in humans is encoded by the IL15RA gene. The IL-15 receptor is composed of three subunits: IL-15R alpha, CD122, and CD132. Two of these subunits, CD122 and CD132, are shared with the receptor for IL-2, but IL-2 receptor has an additional subunit (CD25). The shared subunits contain the cytoplasmic motifs required for signal transduction, and this forms the basis of many overlapping biological activities of IL15 and IL2, although in vivo the two cytokines have separate biological effects. This may be due to effects of the respective alpha chains, which are unique to each receptor, the kinetics and affinity of cytokine-cytokine receptor binding, or due to the availability and concentration of each cytokine.

IL-15Rα specifically binds IL15 with very high affinity and is capable of binding IL-15 independently of other subunits. It is suggested that this property allows IL-15 to be produced by one cell, endocytosed by another cell, and then presented to a third-party cell.

This receptor is reported to enhance cell proliferation and expression of apoptosis inhibitor BCL2L1/BCL2-XL and BCL2. Multiple alternatively spliced transcript variants of this gene have been reported. The full-length sequences of only two variants encoding distinct isoforms are available.

Several isoforms of the IL-15Rα protein have been detected. These isoforms can either result from alternative splicing of the mRNA encoding for the receptor or by shedding of the extra cellular domain of the receptor protein.

III. PEPTOID COMPOSITIONS

Peptoids, or poly-N-substituted glycines, are a class of peptidomimetics whose side chains are appended to the nitrogen atom of the peptide backbone, rather than to the α-carbons (as they are in amino acids). In peptoids, the side chain is connected to the nitrogen of the peptide backbone, instead of the α-carbon as in peptides. Notably, peptoids lack the amide hydrogen which is responsible for many of the secondary structure elements in peptides and proteins.

Following the sub-monomer protocol originally created by Ron Zuckermann, each residue is installed in two steps: acylation and displacement. In the acylation step a haloacetic acid, typically bromoacetic acid activated by diisopropylcarbodiimide reacts with the amine of the previous residue. In the displacement step (a classical SN2 reaction), an amine displaces the halide to form the N-substituted glycine residue. The submonomer approach allows the use of any commercially available or synthetically accessible amine with great potential for combinatorial chemistry.

Like D-Peptides and β peptides, peptoids are completely resistant to proteolysis, and are therefore advantageous for therapeutic applications where proteolysis is a major issue. Since secondary structure in peptoids does not involve hydrogen bonding, it is not typically denatured by solvent, temperature, or chemical denaturants such as urea (see details below).

Notably, since the amino portion of the amino acid results from the use of any amine, thousands of commercially available amines can be used to generate unprecedented chemical diversity at each position at costs far lower than would be required for similar peptides or peptidomimetics. To date, at least 230 different amines have been used as side chains in peptoids.

Peptoid oligomers are known to be conformationally unstable, due to the flexibility of the main-chain methylene groups and the absence of stabilizing hydrogen bond interactions along the backbone. Nevertheless, through the choice of appropriate side chains it is possible to form specific steric or electronic interactions that favour the formation of stable secondary structures like helices, especially peptoids with C-α-branched side chains are known to adopt structure analogous to polyproline I helix. Different strategies have been employed to predict and characterize peptoid secondary structure, with the ultimate goal of developing fully folded peptoid protein structures. The cis/trans amide bond isomerization still leads to a conformational heterogeneity which doesn't allow for the formation of homogeneous peptoid foldamers. Nonetheless scientists were able to find trans-inducer N-Aryl side chains promoting polyproline type II helix, and strong cis-inducer such as bulky naphtylethyl and tert-butyl side chains. It was also found that n→π* interactions can modulate the ratio of cis/trans amide bond conformers, until reaching a complete control of the cis conformer in the peptoid backbone using a functionalizable triazolium side chain.

Figure 5:
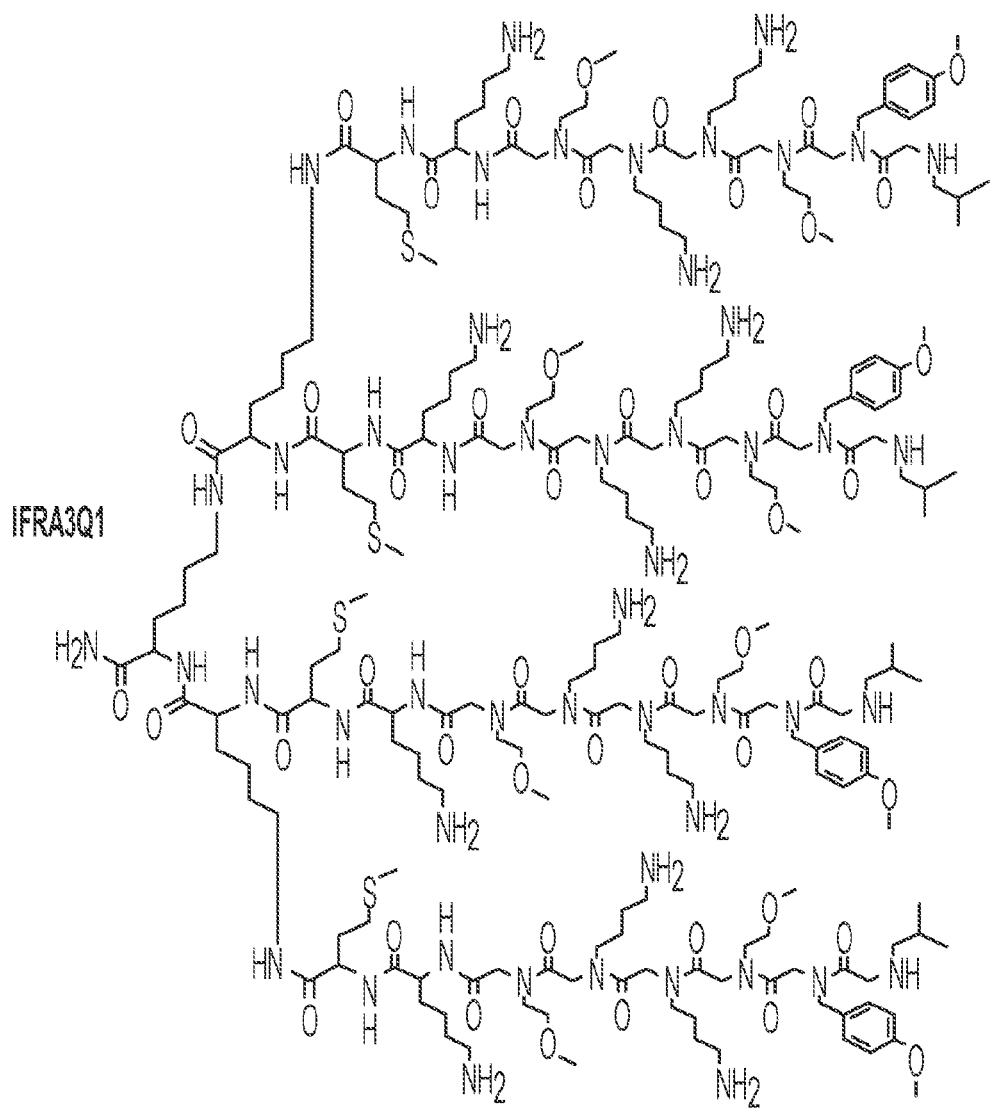
FIG. 5. Chemical structure of IFRA3 tetramer.

Peptoid and peptoid multimers of the present disclosure are shown in FIGS. 4-6.

IV. TREATMENT/PREVENTION OF AUTOIMMUNE/INFLAMMATORY DISORDERS

A. Formulation and Administration

The present disclosure provides pharmaceutical compositions comprising peptoids and peptoid multimers. Such compositions comprise a prophylactically or therapeutically effective amount of a peptoids and peptoid multimers, and a pharmaceutically acceptable carrier. In a specific embodiment, the term "pharmaceutically acceptable" means approved by a regulatory agency of the Federal or a state government or listed in the U.S. Pharmacopeia or other generally recognized pharmacopeia for use in animals, and more particularly in humans. The term "carrier" refers to a diluent, excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. Water is a particular carrier when the pharmaceutical composition is administered intravenously. Saline solutions and aqueous dextrose and glycerol solutions can also be employed as liquid carriers, particularly for injectable solutions. Other suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like.

The composition, if desired, can also contain minor amounts of wetting or emulsifying agents, or pH buffering agents. These compositions can take the form of solutions, suspensions, emulsion, tablets, pills, capsules, powders, sustained-release formulations and the like. Oral formulations can include standard carriers such as pharmaceutical grades of mannitol, lactose, starch, magnesium stearate, sodium saccharine, cellulose, magnesium carbonate, etc. Examples of suitable pharmaceutical agents are described in "Remington's Pharmaceutical Sciences." Such compositions will contain a prophylactically or therapeutically effective amount of the peptoid or peptoid multimer, preferably in purified form, together with a suitable amount of carrier so as to provide the form for proper administration to the patient. The formulation should suit the mode of administration, which can be oral, intravenous, intraarterial, intrabuccal, intranasal, nebulized, bronchial inhalation, or delivered by mechanical ventilation.

Generally, the ingredients of compositions of the disclosure are supplied either separately or mixed together in unit dosage form, for example, as a dry lyophilized powder or water-free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration.

The compositions of the disclosure can be formulated as neutral or salt forms. Pharmaceutically acceptable salts include those formed with anions such as those derived from hydrochloric, phosphoric, acetic, oxalic, tartaric acids, etc., and those formed with cations such as those derived from sodium, potassium, ammonium, calcium, ferric hydroxides, isopropylamine, triethylamine, 2-ethylamino ethanol, histidine, procaine, etc.

B. Combination Therapy

One general approach to treat disease is to combine multiple therapies as a way of increasing their efficacy. In the context of the present disclosure, the inventors propose that the peptoid and peptoid multimer therapy can be used successfully in conjunction with another therapeutic or regimen to treat inflammation/autoimmunity.

Using the methods and compositions of the present disclosure, one would generally contact a subject with the peptoids and peptoid multimers of the present disclosure and another therapy. These therapies would be provided in a combined amount effective to address one or more symptom or underlying cause of disease. This process may involve administering both agents/therapies at the same time. This may be achieved by administering a single composition or pharmacological formulation that includes both therapies, or by using two distinct compositions or formulations, at the same time, wherein one composition includes the peptoids and peptoid multimers of the present disclosure and the other therapy.

Alternatively, one treatment may precede or follow the other therapy by intervals ranging from minutes to weeks. In embodiments where the therapies are applied separately, one would generally ensure that a significant period of time did not expire between each delivery, such that the therapies would still be able to exert an advantageously combined effect on the subject. In such instances, it is contemplated that one would contact the cell with both modalities within about 12-24 hours of each other, within about 6-12 hours of each other, or with a delay time of only about 12 hours. In some situations, it may be desirable to extend the time period for treatment significantly; however, where several days (2, 3, 4, 5, 6 or 7) to several weeks (1, 2, 3, 4, 5, 6, 7 or 8) lapse between the respective administrations.

It also is conceivable that more than one administration of either the peptoid/peptoid multimer or the other therapy will be desired. Various combinations may be employed, where the peptoid or peptoid multimer is "A" and the other therapy is "B," as exemplified below:

| A/B/A | B/A/B | B/B/A | A/A/B | B/A/A | A/B/B | B/B/B/A | B/B/A/B |
|-------|-------|-------|-------|-------|-------|---------|---------|
| A/A/B/B | A/B/A/B | A/B/B/A | B/B/A/A | B/A/B/A | B/A/A/B | B/B/B/A | |
| A/A/A/B | B/A//A/A | A/B/A/A | A/A/B/A | AB/B/B | B/A/B/B | B/B/A/B | |

Other combinations are contemplated. Again, to achieve a therapeutic goal, both therapies are delivered to a subject in a combined amount effective to achieve that goal. Specific combination therapy strategies include combining the peptoid/peptoid multimer therapy with the following classes of immunosuppressive/anti-inflammatory drugs: immunosuppressive biologics (including antibodies), steroids, cytostatics, and/or drugs acting on immunophilins. Examples of these immunosuppressive drugs to be using in combination therapies alongside the peptoid/peptoid multimer therapy include: dexamethasone, hydrocortisone, methylprednisone, prednisone, budesonide, prednisolone, methotrexate, azathioprine, leflunomide, mycophenolate, cyclosporine, tacrolimus, sirolimus, everolimus, abatacept, adalimumab, anakinra, certolizumab, etanercept, golimumab, infliximab, ixekizumab, natalizumab, rituximab, secukinumab, tocilizumab, ustekinumab, vedolizumab, basiliximab, daclizumab, muromonab, myriocin or fingolimod.

V. KITS

In still further embodiments, the present disclosure concerns kits for use with the methods described above. The kits will thus comprise, in suitable container means, one or more peptoids and/or peptoid multimers that inhibit IL-15, and optionally other reagents. The components of the kits may be packaged either in aqueous media or in lyophilized form.

The container means of the kits will generally include at least one vial, test tube, flask, bottle, syringe or other container means, into which the peptoid or multimer may be placed, or preferably, suitably aliquoted. The kits of the present disclosure will also typically include a means for containing the peptoid, peptoid multimer, and any other reagent containers in close confinement for commercial sale. Such containers may include injection or blow-molded plastic containers into which the desired vials are retained.

VI. EXAMPLES

The following examples are included to demonstrate preferred embodiments. It should be appreciated by those of skill in the art that the techniques disclosed in the examples that follow represent techniques discovered by the inventors to function well in the practice of embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1

To identify compounds that can bind to IL-15 receptor, the inventors performed an on-bead two-color (OBTC) screening experiment. HeLa cells expressing IL-15 Rα were stained with red Qdot® 565 nanocrystals and HeLa cells not expressing IL-15 Rα were stained with green Qdot® 565 nanocrystals. One million green cells and one million red cells were mixed and incubated for 1 hour with 50,000 peptoid compound library beads containing one-compound on one bead at 23° C. Beads that bind to only red cells and not green cells were isolated under fluorescent microscope and the compound attached to the bead was identified by mass spectrometry. This approach resulted in successfully identifying a hit compound, IFRA3, that binds to the IL-15 receptor subunit a. See FIGS. 1A-C.

Figure 2A:
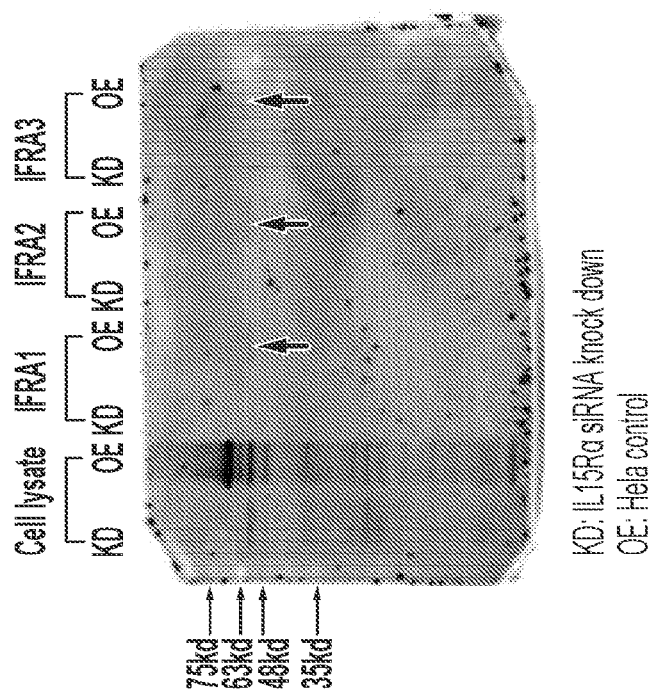

The inventors then performed in vitro pull-down assay to demonstrate the interaction between IFRA3 and IL-15 receptor a (IL15RA). Cell lysates from IL-15RA positive HeLa cells (expressing IL15RA) or IL-15RA negative HeLa cells (transfected with IL15RA siRNA to knock down IL15RA) were incubated with beads conjugated with IFRA1, or IFRA2, or IFRA3 at 4° C. overnight. The beads were then washed with RIPA buffer for 3 times, and the binding proteins were eluted with 1% SDS. The yielded lysates were then applied onto 12% SDS-PAGE gel and subjected to Coomassie blue staining. Protein in the gel was transferred to membrane and identified by western blotting analysis with antibody against IL-15RA. This assay demonstrated that IFRA1, IFRA2, and IFRA3 can pull down a protein band corresponding to the size of IL15RA (indicated by red arrows). Western blot results confirmed the identity of the protein band as IL15RA. Thus, the data support that IFRA3 can bind to IL15RA. See FIGS. 2A-B.

Figure 3:
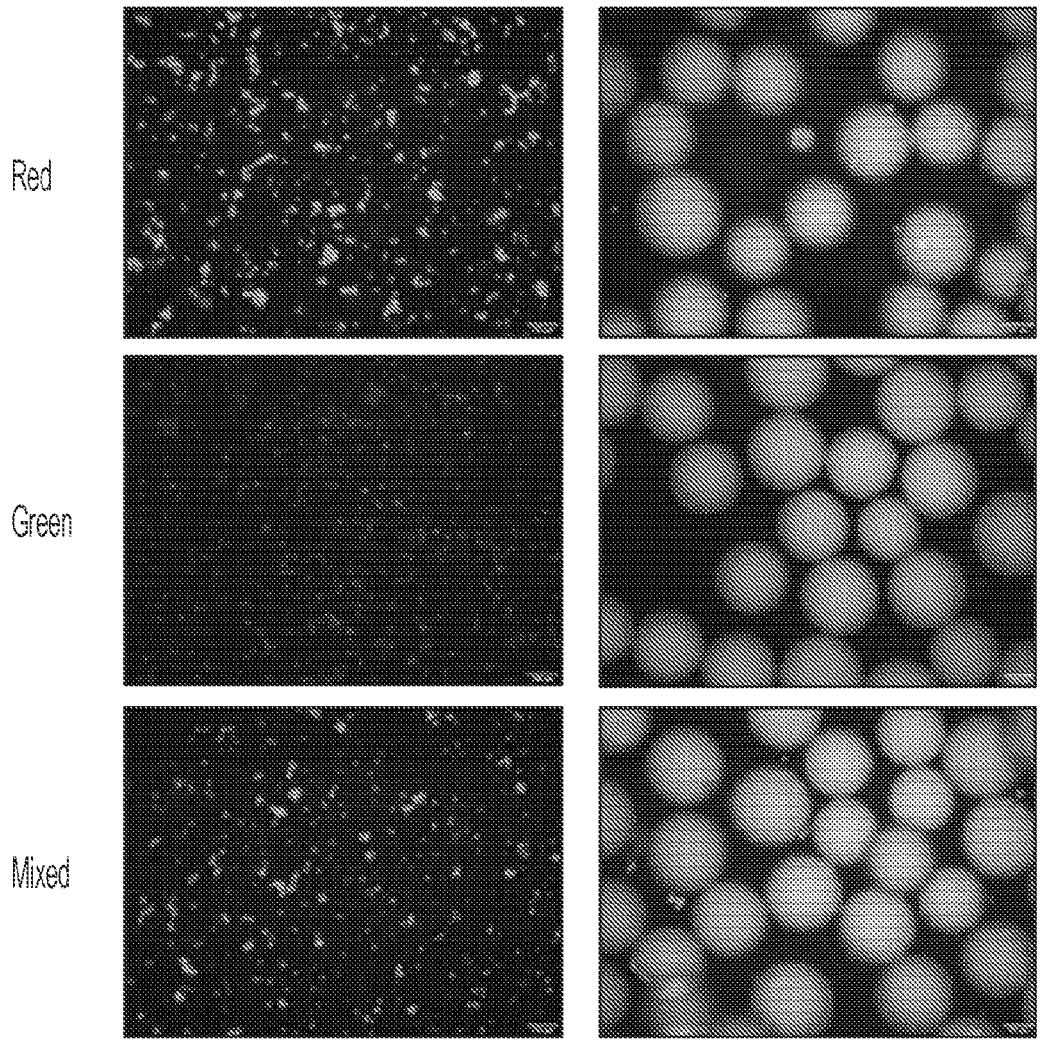
FIG. 3. Validation of the binding of IFRA3 to IL-15 receptor a subunit using OBTC. The compound IFRA3 was resynthesized on the beads and were incubated with IL-15 RA expressing HeLa cells (red stained) and IL-15RA negative HeLa cells (green stained) individually as well as 1:1 mixture of red and green cells. The result showed that only red cells bind to the beads, the green cells do not bind the beads.

Next, the compound IFRA3 was resynthesized on the beads and were incubated with IL-15 RA expressing HeLa cells (red stained) and IL-15RA negative HeLa cells (green stained) individually as well as 1:1 mixture of red and green cells. The result showed that only red cells bind to the beads, and the green cells do not bind. This result confirmed that IFRA3 can specifically bind to IL15RA. The interaction is not due to some non-specific binding mechanisms. See FIG. 3.

To determine if IFRA3 and its derivatives can regulate the function of IL-15, the inventors performed CTLL-2 proliferation assay. The proliferation of murine T cell line CTLL-2 depends on the presence and activity of IL-15. CTLL-2 cells were seeded into 96-well plates and treated with IL-15 in the presence or absence of IFRA3D1, IFRA3T1, or IFRA3Q1 at indicated concentrations for 72 hours. CTLL-2 cell proliferation was measured by WST-1 assay. The results showed that the proliferation of CTLL-2 cells depends on IL-15. In the absence of IL-15, cells do not grow. IL-15 significantly stimulated cell growth. IFRA3 and its derivatives had no effects on cell proliferation by themselves. IFRA3Q1 completely inhibited the ability of IL-15 to stimulate the proliferation of CTLL-2 cells, while IFRA3D1 and IFRA3T1 had less effects. The data suggest that IFRA3Q1 is a potent antagonist of IL15RA and is able to completely inhibit the function of IL-15. See FIGS. 7A-C.

Figure 8:
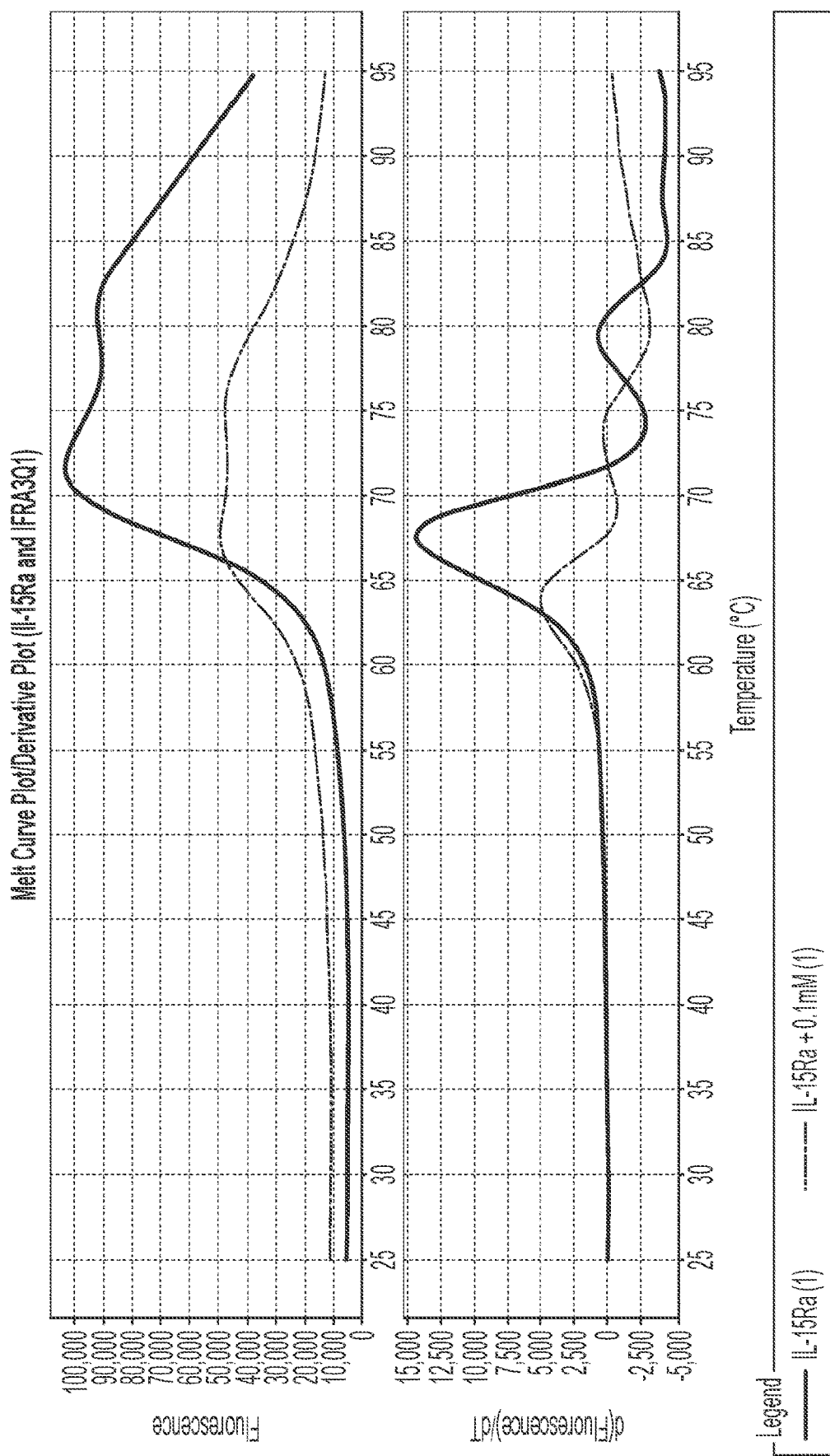
FIG. 8. Demonstration of a direct interaction between IFRA3Q1 and IL-15 receptor α subunit. The Applied Biosystems™ Protein Thermal Shift™ assay measures protein thermal stability using a fluorescent protein-binding dye. The Protein Thermal Shift dye does not fluoresce in aqueous solutions but fluoresces in nonpolar environments. The protein is mixed with the dye and heated; as it unfolds or melts, hydrophobic parts of the protein are exposed and bind to the dye, resulting in fluorescence emission detected by the qPCR system. Binding of a ligand to the protein changes the stability of the protein, resulting in a change in fluorescence intensity. IL-15Rα indicates only protein (5 µg of IL-15Rα) without ligand (IFRA3Q1). IL-15Rα+0.1 mM indicates protein (5 µg of IL-15Rα) and 0.1 mM IFRA3Q1. When recombinant IL-15Rα is mixed with IFRA3, a decrease in protein melting temperature was observed. This data suggests that IFRA3 binds to IL-15Rα directly and causes a conformation change (unfolding) of IL-15Rα.
Figure 9:
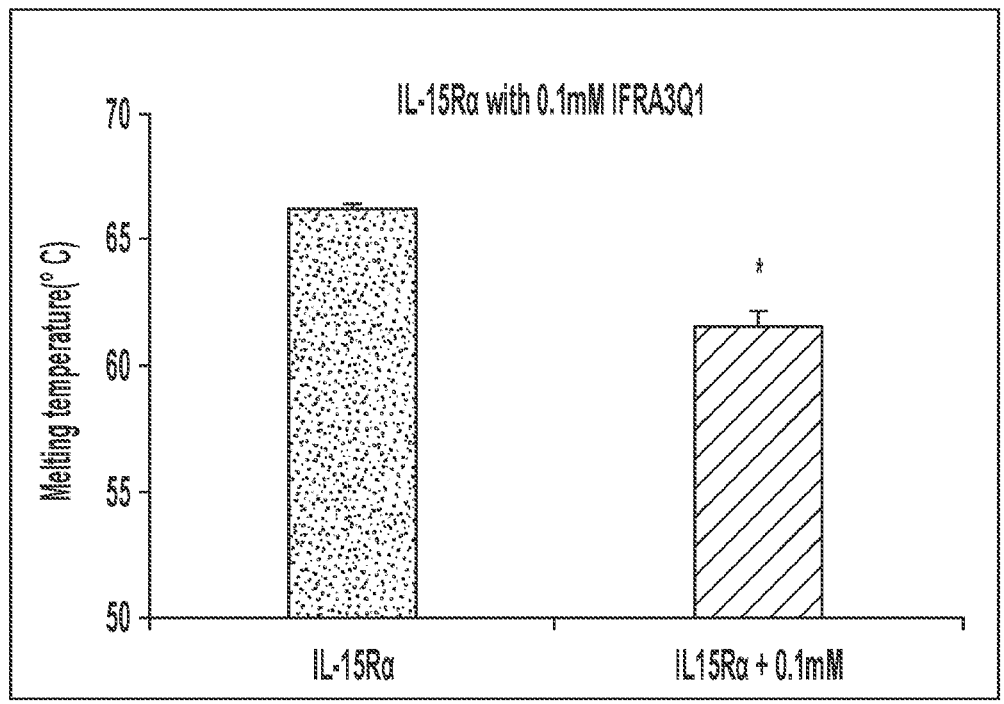
FIG. 9. Melting temperatures of IL-15Rα (from FIG. 8) were show in the presence or absence of 0.1 mM IFRA3Q1. The melting temperature was significantly decreased when 0.1 mM of IFRA3Q1 was added. Data represents mean and standard deviation. * $p<0.05$.

To determine whether IFRA3Q1 directly binds to IL-15 receptor a subunit, the inventors performed a thermal shift experiment. Using the Applied Biosystems™ Protein Thermal Shift™ assay, the Protein Thermal Shift dye (which does not fluoresce in aqueous solutions) was mixed with 5 mg of recombinant IL-15 Ra protein and heated. As the IL-15Ra protein unfolds and melts, hydrophobic parts of the protein are exposed and bind to the dye, resulting in fluorescence emission detected by the qPCR system. If IFRA3Q1 binds to IL-15Ra, the stability of IL-15Ra will change, and the melting temperature will change as a result. When 0.1 mM of IFRA3Q1 was added to the mixture of 5 mg IL-15 Ra protein and Thermal Shift dye, the melting temperature was decreased. This result indicates a direct interaction between IFRA3Q1 and IL-15 receptor a subunit, and IL-15Ra causes the unfolding of IL-15Ra. See FIGS. 8-9.

Figure 10:
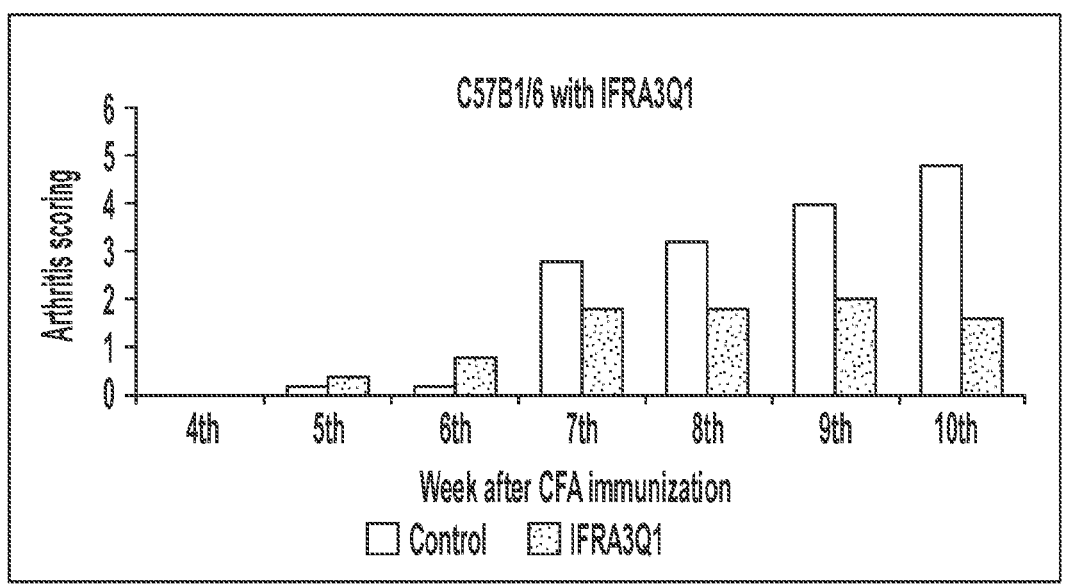
FIG. 10. IFRA3 inhibits collagen-induced arthritis (CIA) in mice. CIA has been the most widely studied model of rheumatoid arthritis (RA). CIA is elicited in C57BL/6 mice by immunization with chicken type II collagen emulsified in complete Freund's adjuvant (CFA). Arthritis scores were measure for C57BL/6 mice with or without treatment with IFRA3Q1. The graph bar represents the average of arthritis scoring for each group (n=5). In each mouse, the maximum number of arthritis can be 16 since the scoring of each paw can be "4" (the severest arthritis, 4 paws×4=16). IFRA3Q1 indicates CFA immunization with IFRA3Q1 treatment (100 µg/mouse i.p., twice per week).
Figure 11:
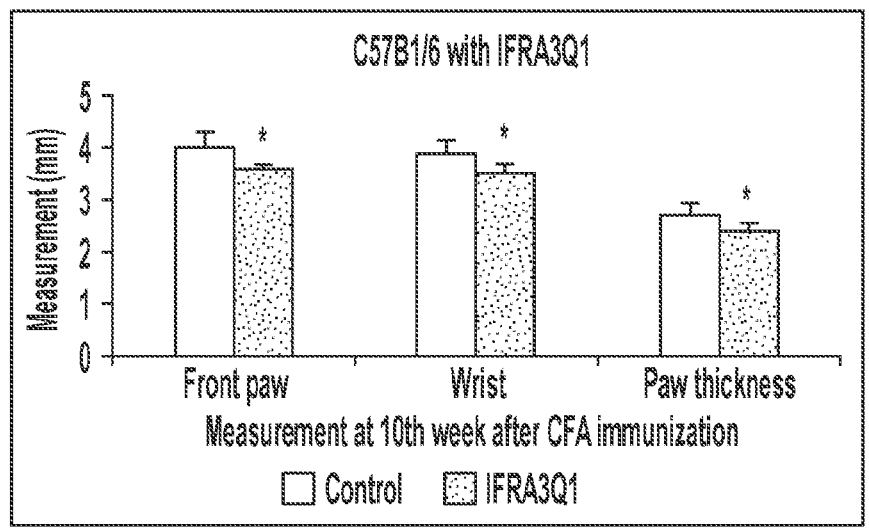
FIG. 11. IFRA3 inhibits collagen-induced arthritis (CIA) in mice. Three parts of front paw were measured in each group of C57BL/6 mice at 10th week after CFA immunization (n=5). The width of front paw and all parts were measured by electronic digital caliper (mm). Control: CFA immunization without IFRA3Q1 treatment. IFRA3Q1: CFA immunization with IFRA3Q1 treatment (100 µg/mouse i.p., twice per week). * $p<0.05$.
Figure 12:
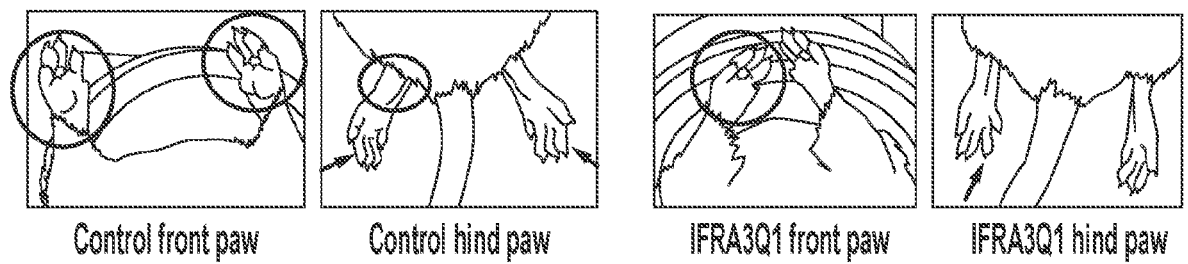
FIG. 12. IFRA3 inhibits collagen-induced arthritis (CIA) in mice. Photos of C57BL/6 mice show front and hind paw of each group. The red circles and arrows indicate arthritis forming parts for control and IFRA3Q1 treatment groups. Control: CFA immunization without IFRA3Q1 treatment. IFRA3Q1: CFA immunization with 100 µg per mouse i.p., twice a week.
Figure 13:
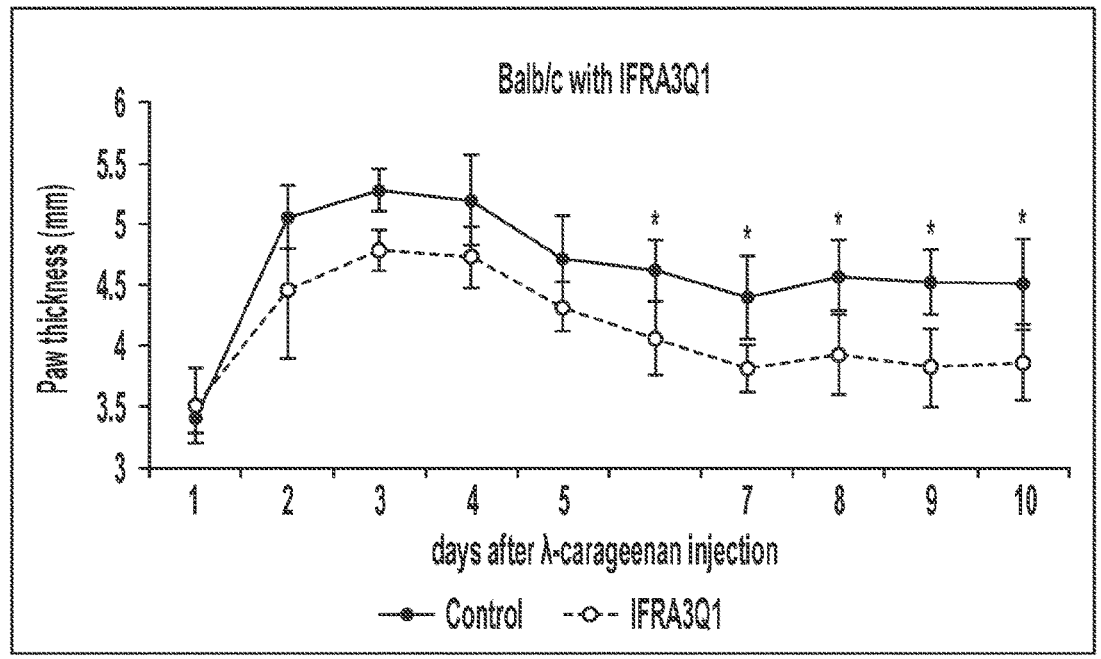
FIG. 13. IFRA3 inhibits local inflammation in Balb/c mice. Injection of λ-carrageenan into the paw caused local inflammation in mice. Co-injection of IFRA3Q1 inhibited the swelling of the paw. The graph represents the mean and standard deviation of paw thickness for each group (n=4). Control indicates injection of 300 µg λ-carrageenan in the paw per mouse without IFRA3Q1 treatment. IFRA3Q1 indicates 300 µg k-carrageenan plus 5 µg of IFRA3Q1 per mouse. * $p<0.05$.
Figure 14:
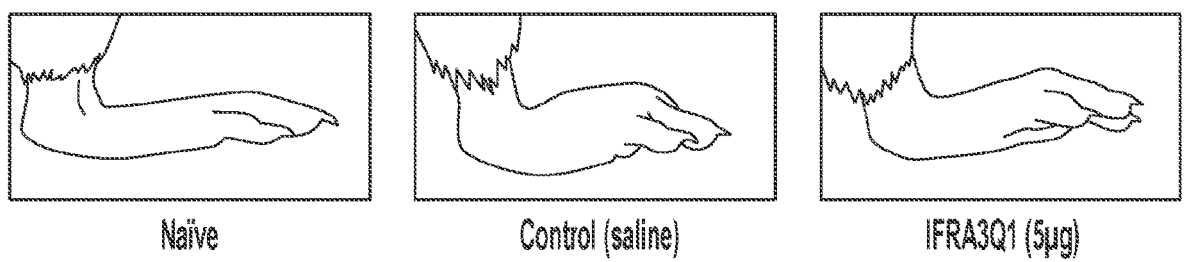
FIG. 14. IFRA3 inhibits local inflammation in Balb/c mice. The photos show Balb/c mice right hind paw. Inflammation was induced by injection of 300 µg λ-carrageenan in the paw. Naïve represents mice without λ-carrageenan injection. Control represents mice injected with λ-carrageenan inflammation and saline. IFRA3Q1 represents mice injected with λ-carrageenan and IFRA3Q1 (5 µg/mouse).
Figure 15:
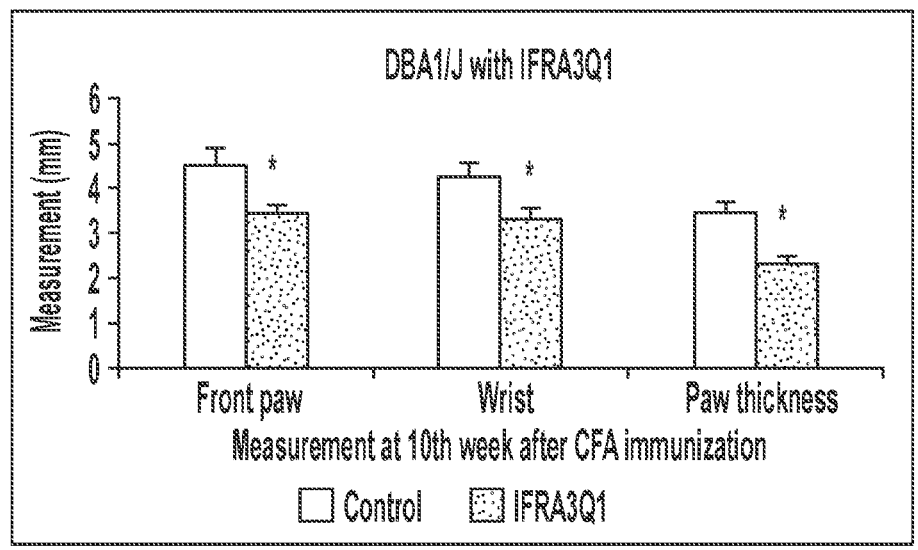
FIG. 15. IFRA3 inhibits collagen-induced arthritis (CIA) in DBA1/J mice. CIA is elicited in DBA1/J mice by immunization with chicken type II collagen emulsified in complete Freund's adjuvant (CFA). The effects of IFRA3Q1 on DBA1/J mice arthritis were measured on front paw. Graph indicates mean and standard deviation for each group. The width of front paw, wrist and paw thickness were measured at 10th week after CFA immunization. Control represents mice with CIA and no IFRA3Q1 treatment (n=4). IFRA3Q1 represents mice with CIA and treated with 100 µg IFRA3Q1, i.p., twice per week (n=3).
Figure 16:
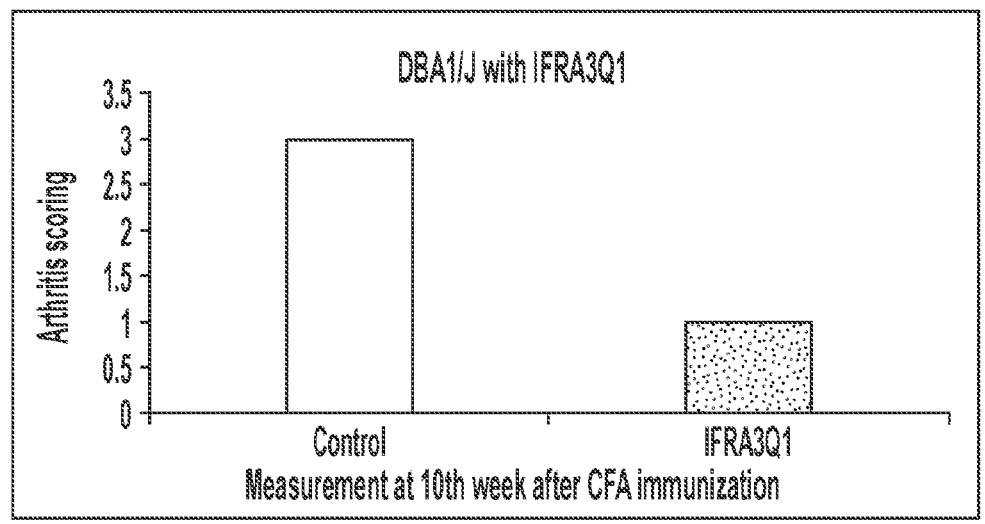
FIG. 16. IFRA3 inhibits collagen-induced arthritis (CIA) in DBA1/J mice. Arthritis scores were measure with or without treatment with IFRA3Q1. Arthritis scores were measured at 10th week after CFA immunization. Bar graph indicates the mean of arthritis scoring for each group. Control: CFA immunization without IFRA3Q1 (n=4). IFRA3Q1: CFA immunization with IFRA3Q1 100 µg, i.p., twice per week (n=3).

The therapeutic efficacy of IFRA3Q1 in the treatment of inflammation and rheumatoid arthritis was determined in mouse models. The inventors used a collagen-induced arthritis (CIA) mouse model in this study. CIA was elicited in C57BL/6 mice by immunization with chicken type II collagen emulsified in complete Freund's adjuvant (CFA). Arthritis scores were measured with or without treatment with IFRA3Q1. IFRA3Q1 was administered by i.p. injection of 100 mg twice per week. Paw thickness was measured electronic digital caliper (mm). The results show that IFRA3Q1 reduced the severity and symptoms of arthritis in mice. See FIGS. 10-12. To determine the therapeutic effects of IFRA3Q1 in local inflammation, the inventors used the carrageenan-induced inflammation model in Balb/c mice. Inflammation was induced by injection of 300 μg λ-carrageenan in the paw of the mice. Co-injection of 5 mg of IFRA3Q1 with 300 μg λ-carrageenan reduced local inflammation in the paw. See FIGS. 13-14. The therapeutic efficacy of IFRA3Q1 was also tested in another strain of mice DBA1/J. CIA was elicited in DBA1/J mice by immunization with chicken type II collagen emulsified in complete Freund's adjuvant (CFA). Paw thickness and arthritis scores were recorded as described above. The results show that IFRA3Q1 reduced the severity and symptoms of arthritis in DBA1/J mice. See FIGS. 15-17.

The total incidence of collagen-induced arthritis in both C57BL/6 and DBA1/J mice was summarized in the table of FIG. 18. The results show the incidence of arthritis was reduced in the IFRA3Q1 treatment group, comparing to the control group.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

VII. REFERENCES

The following references, to the extent that they provide exemplary procedural or other details supplementary to those set forth herein, are specifically incorporated herein by reference.

Remington's Pharmaceutical Sciences, 15th Ed., 3:624-652, 1990.

Shukla et al., *European J. Med. Chem.* 137:1-10, 2017.

What is claimed is:

1. A method of inhibiting IL-15 signaling in a human subject comprising administering to said subject an effective amount of a peptoid multimer having the following structure:
   wherein the multimer has a structure selected from the group consisting of:

IFRA3D1
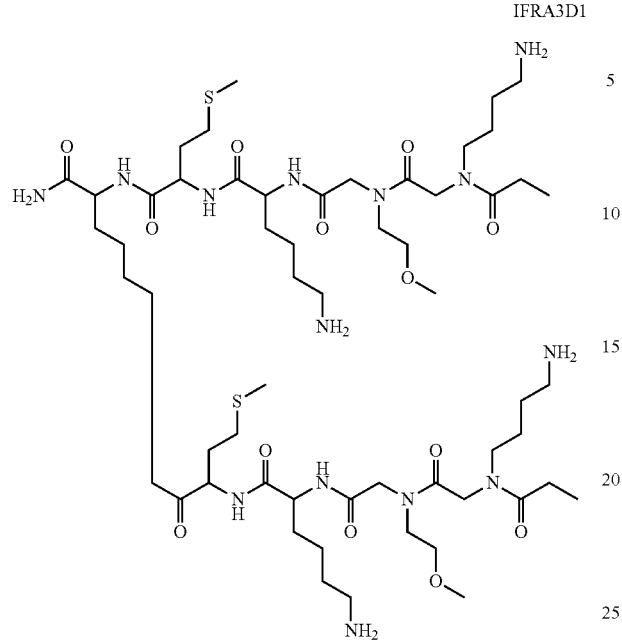
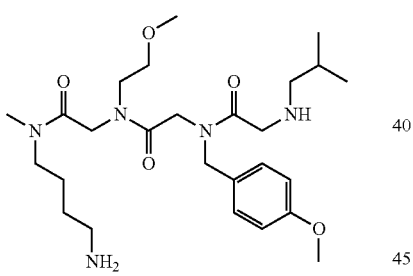
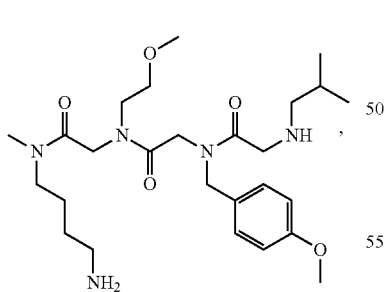
-continued
IFRA3T1
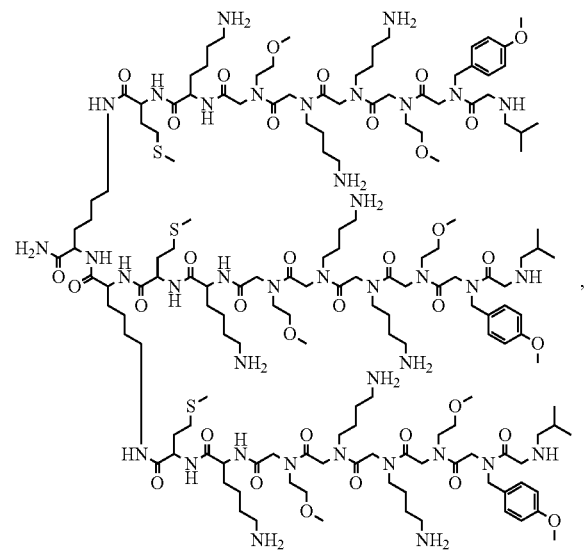
IFRA3Q1
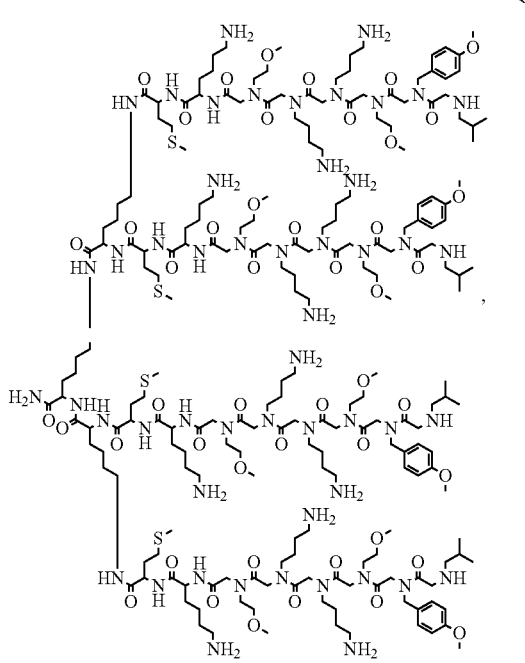

IFRA3D2
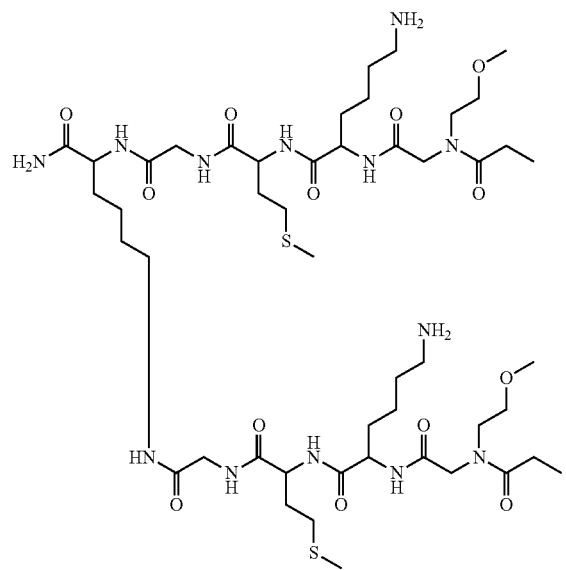
IFRA3D3
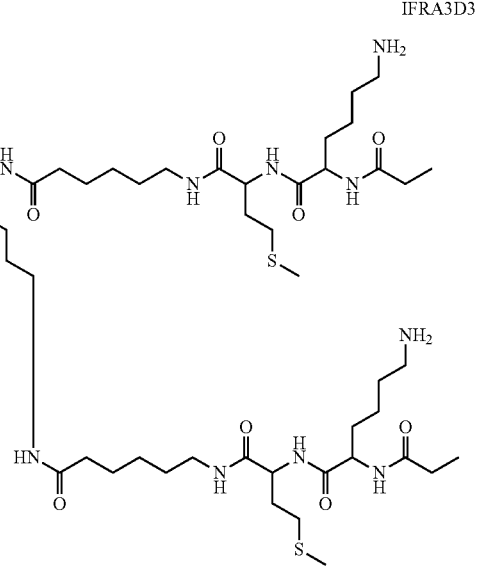

IFRA3DOTAQ1
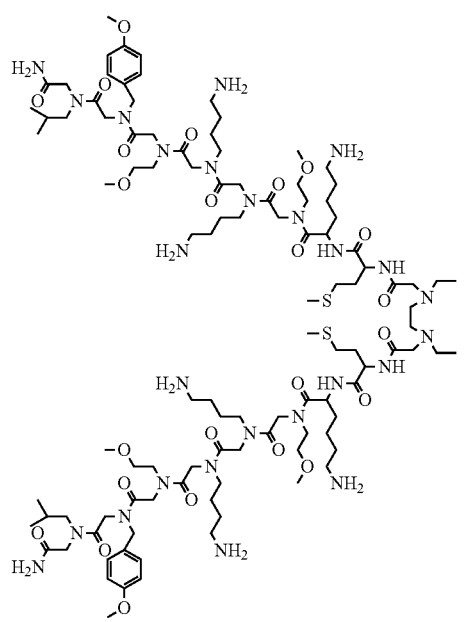
IFRA3DOTAT1
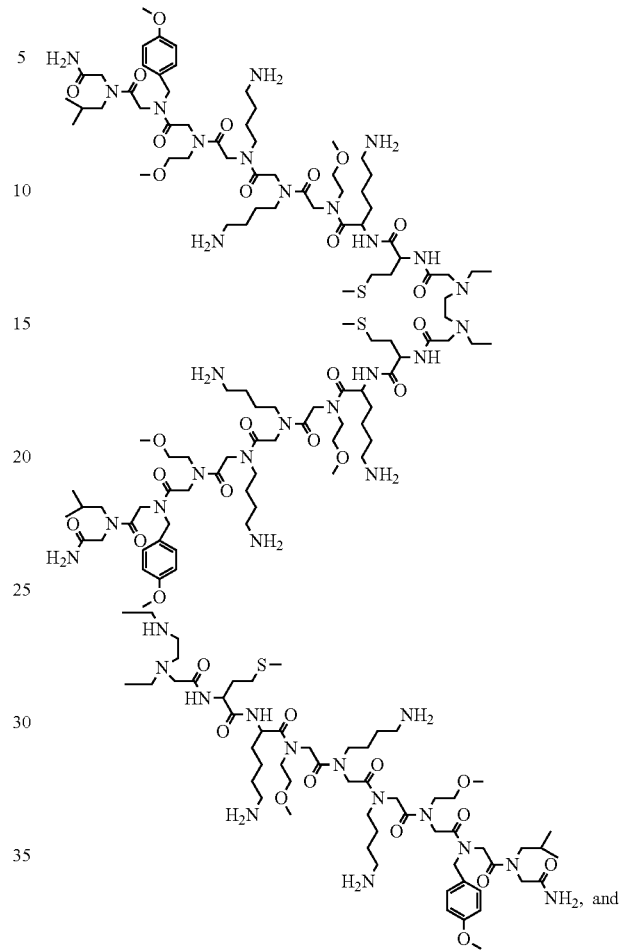
IFRA3DOTAD1
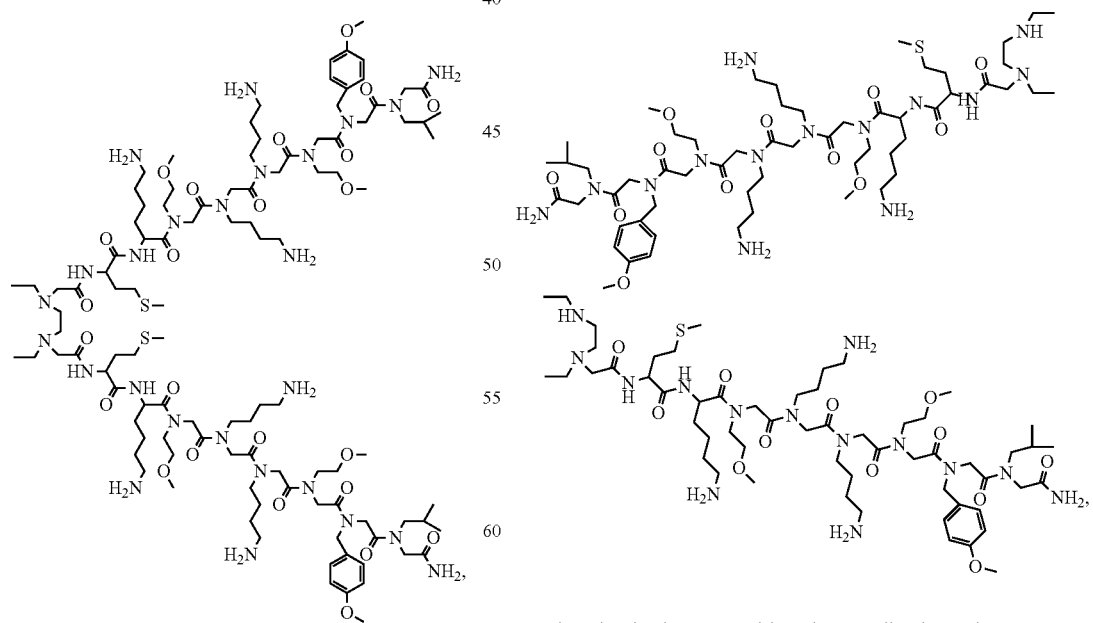
wherein the human subject is a pediatric patient, a teenager, or an adult.
2. The method of claim 1, wherein said subject suffers from an inflammatory disease or disorder.

3. The method of claim 2, wherein the inflammatory disease or disorder causes inflammation in the subject's liver, pancreas, salivary glands, ovaries, testes, skin, central nervous system, synovial tissue, gastrointestinal tract, thyroid, kidneys, lungs or eyes.

4. The method of claim 2, wherein said inflammatory disease or disorder is atopic dermatitis, autoimmune hepatitis, autoimmune retinopathy, celiac disease, chronic transplant rejection, Churg-Strauss syndrome, Graves' disease, Graves' ophthalmopathy, inflammatory bowel disease, graft-versus-host disease, Hashimoto's disease, juvenile idiopathic arthritis, multiple sclerosis, myasthenia gravis, neuromyelitis optica, pemphigus vulgaris, psoriasis, rheumatoid arthritis, Sarcoidosis, Sjogren's syndrome, Systemic Scleroderma, systemic lupus erythematosus, or ulcerative colitis.

5. The method of claim 2, wherein said inflammatory disease or disorder is an autoimmune disease.

6. The method of claim 1, wherein the administering is chronic.

7. The method of claim 6, wherein the chronic administration is daily, weekly, monthly, every other month, every three months, every four months, every five months, every six months, every nine months or every year.

8. The method of claim 1, further comprising administering to said subject a second therapy.

9. The method of claim 8, wherein said second therapy is a non-steroidal anti-inflammatory drug, a steroid, an immunosuppressive biologic, or an anti-metabolite.

* * * * *